(12) United States Patent
Yamanaka

(10) Patent No.: US 6,637,887 B2
(45) Date of Patent: Oct. 28, 2003

(54) MULTI-DISPLAY DEVICE

(75) Inventor: Kazuya Yamanaka, Hachioji (JP)

(73) Assignee: Olympus Optical (JP)

( * ) Notice: Subject to any disclaimer, the term of this patent is extended or adjusted under 35 U.S.C. 154(b) by 28 days.

(21) Appl. No.: 09/998,865

(22) Filed: Nov. 2, 2001

(65) Prior Publication Data

US 2002/0054275 A1 May 9, 2002

(30) Foreign Application Priority Data

Nov. 7, 2000 (JP) .......................... 2000-339477

(51) Int. Cl.$^7$ .................. G03B 21/26; G03B 21/00; H04N 9/31; H04N 3/22; G02F 1/00
(52) U.S. Cl. ...................... 353/30; 353/31; 353/29; 353/94; 353/122; 348/744; 348/745; 348/759; 348/798
(58) Field of Search ................ 353/94, 97, 7, 353/10, 29, 30, 31, 122; 348/744, 756, 751, 755, 759, 766, 774, 790, 779, 781, 798, 745; 349/517

(56) References Cited

U.S. PATENT DOCUMENTS

| | | | | |
|---|---|---|---|---|
| 5,754,342 A | * | 5/1998 | Ohnishi et al. | ............. 359/569 |
| 5,765,934 A | * | 6/1998 | Okamori et al. | .............. 353/94 |
| 6,017,123 A | * | 1/2000 | Bleha et al. | ................... 353/30 |
| 6,191,872 B1 | * | 2/2001 | DeCaro et al. | ............ 358/509 |
| 6,318,863 B1 | * | 11/2001 | Tiao et al. | .................... 353/31 |
| 2001/0022651 A1 | * | 9/2001 | Kubota et al. | ............... 353/94 |

FOREIGN PATENT DOCUMENTS

| | | | |
|---|---|---|---|
| JP | 3-053288 | 3/1991 | ............ G09F/9/40 |
| JP | 5-103286 | 4/1993 | ............ H04N/5/74 |
| JP | 6-169444 | 6/1994 | ............ H04N/5/74 |
| JP | 9-211386 | 8/1997 | .......... G02B/27/18 |

* cited by examiner

*Primary Examiner*—Russell Adams
*Assistant Examiner*—Melissa J Koval
(74) *Attorney, Agent, or Firm*—Ostrolenk, Faber, Gerb & Soffen, LLP

(57) ABSTRACT

A multi-display device synthesizes partial images, by using multiple projectors to construct one image. Each projector has an illumination device, a lattice-like lens array, a display, and a projection lens. The illumination device and lattice-like lens array form secondary light source images that are arrayed in a rectangular lattice. The display is illuminated by the plurality of secondary light source images and displays partial images. The projection lens projects the partial images. Interceptors intercept the margins of projected partial images to obtain uniform luminance. Each interceptor has an intercepting edge that is alternately concave and convex. The height of the convex parts and the pitch between adjoining concave and convex parts are selected so that projections produced by adjoining secondary light source images are displaced from each other by a half phase. Thus, a belt-shaped distribution of luminance values in the margins of the partial images are resolved nearly perfectly.

18 Claims, 12 Drawing Sheets

FIG.3B  FIG.3C

FIG.19A FIG.19B FIG.19C
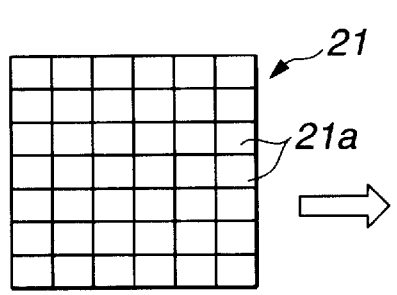
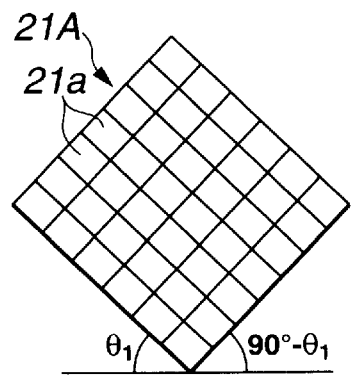
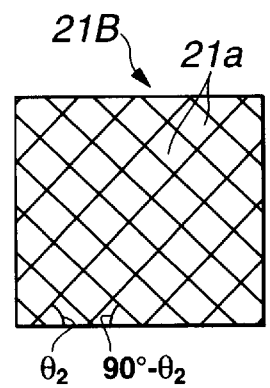
FIG.19D
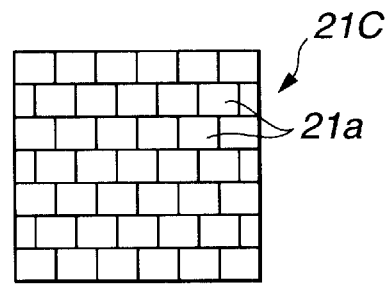

MULTI-DISPLAY DEVICE

This application claims benefit of Japanese Application No. 2000-339477 filed in Japan on Nov. 7, 2000, the contents of which are incorporated by this reference.

BACKGROUND OF THE INVENTION

1. Field of the Invention

The present invention relates to a multi-display device, or more particularly, to a multi-display device that combines partial images projected from a plurality of projectors so as to construct one image.

2. Description of the Related Art

In the past, various proposals have been made concerning a multi-display device that combines partial images projected from a plurality of projectors so as to construct one image.

As for such a multi-display device, for example, Japanese Patent Unexamined Publication No. 9-211386 has disclosed a projection system that projects a synthetic image by overlapping a first image and a second image in a superposed-portion area on a screen. The projector system has a first light bulb projector and a second light bulb projector. Each projector includes a light source, a light bulb, a condenser, and a projection lens. The light bulb reflects or transmits image light. The condenser directs light emanating from the light source to the light bulb. The projection system further includes a uniting means that is located on a light path linking the light bulb and the projection lens, the light source and the condenser, or the photography lens and the screen. The uniting means smoothes a difference between light levels attained in the superposed-portion area when the light bulb is on and when it is off without lowering a contrast ratio offered by the first or the second light bulb projector. Thus, a seam in an image can be nullified but the contrast ratio will not be lowered.

Moreover, Japanese Patent Unexamined Publication No. 3-53288 describes a multi-video projector composed of a plurality of video projectors each of which includes at least an image projection unit and a screen. The multi-video projector has a partition panel interposed between the image projection unit and the screen. The partition panel has the ability to intercept the whole or part of the image projection light, which is not included in prisms defined by an effective image field on the screen and an intersection between an exit pupil of the projection lens and the ray axis of the emitted light.

Moreover, Japanese Patent Unexamined Publication No. 3-53288 describes a multi-video projector composed of a plurality of video projectors each of which includes at least an image projection unit and a screen. The multi-video projector has a partition panel interposed between the image projection unit and the screen. The partition panel has the ability to intercept the whole or part of the image projection light, which is not included in prisms defined by an effective image field on the screen and an intersection between an exit pupil of the projection lens and the ray axis of the emitted light.

Furthermore, Japanese Patent Unexamined Publication No. 6-169444 describes a video multi-image projection system that simultaneously projects a plurality of images on a screen. When adjoining images are projected to overlap each other, the superposed portion of the overlapping images is transmitted through either of a half mirror, a translucent white member, or a translucent black member. The transmittance rate of the overlapping images ranges from 35% to 45%.

Patent Cooperation Treaty Publication No. WO95/25292 describes an image projecting apparatus in which each projector has a lamp, a condensing optical system, a liquid crystal display panel, a projecting optical system, and one or more comb-like members having substantially triangular teeth. The condensing optical system condenses and radiates the light emanating from the lamp. The liquid crystal display panel receives light radiated from the lamp through the converging optical system and displays an image. The projecting optical system projects an optical image displayed on the liquid crystal display panel. The image projecting apparatus is positioned so that the teeth of the mask member will intercept the marginal part of the light propagated from the liquid crystal display panel to the projecting optical system. Owing to the teeth of the mask member, a light level attenuates towards the margin of the superposed portion of projected overlapping images. Thus, partial images are synthesized smoothly. According to the disclosed technology, the comb-like mask member is intended to control a light attenuation curve, which indicates a change in light level due to attenuation occurring in the superposed portion of partial images.

A known technology for improving the homogeneity of a projected screen images that is implemented in a light source included in a multi-display device having a plurality of projectors like the ones mentioned above will be described with reference to FIG. 3A to FIG. 3F.

A dot-like light source shown in FIG. 3D is adopted as a light source to be included in a projector. An illumination device 11 having such a dot-like light source may be used to illuminate a display device 16. In this case, the display device is, as shown in FIG. 3E, illuminated with a dot-like light source image alone. At this time, as shown in FIG. 3F, the luminance in the center of a radiated surface tends to get higher than the one in the surrounding portion thereof.

As far as a multi-display device including a plurality of projectors is concerned, partial images projected by the projectors are joined in order to construct one image. It is therefore especially important that the luminance in each partial image is uniform.

As shown in FIG. 3A, light emanating from the illumination device 11 is passed through a first lattice-like (dot-matrix-like) lens array 12 and a second lattice-like (dot-matrix-like) lens array 13. Thus, a plurality of secondary light source images arrayed on a planar basis (or more particularly, in the form of a lattice-like matrix) is produced as shown in FIG. 3B.

Consequently, as shown in FIG. 3C, the display screen of the display device 16 is illuminated nearly uniformly so that uniform brightness will be observed all over the display screen.

On the other hand, in the aforesaid multi-display device having a plurality of projectors, partial images are projected so that adjoining partial images will overlap to have their margins superposed on each other. A sheet interceptor is used therefore to intercept luminous flux that is projected at an area of superposed portion on the screen and that represents partial images. This is intended to prevent the luminance in superposed portion of adjoining images from getting higher. Consequently, when a portion of the partial image is superposed on a portion of an adjoining partial image, the superposed portion exhibits the same luminance as the other portions of the partial images that are not superposed on each other.

In the foregoing configuration, when a plurality of light sources like the aforesaid one (or a plurality of secondary light source images) are used to illuminate a display device, one sheet interceptor provides a plurality of shadows. Consequently, a stepwise distribution of luminance values occurs in the margin of a partial image projected on the screen by each projector.

FIG. 28 shows a stepwise distribution of luminance values on the screen which occurs when a sheet interceptor is used to intercept light radiated as a plurality of secondary light source images.

As shown in FIG. 28, when light radiated as a plurality of secondary light source images 18a is partly intercepted by a sheet interceptor 95, a border between an intercepted area on the screen 3 and a non-intercepted area thereon varies depending on the position of each secondary light image 18a. This results in a belt-shaped distribution of luminance values 96 that is a stepwise difference in luminance.

Furthermore, when a double-plate projector that divides the path of illumination light into portions associated with colors and that illuminates display devices associated with the colors is adopted, the marginal part of the projected light may suffer color disjunction. This is attributable to a difference in the optical length or a shift of an exit pupil dependent on a wavelength. When the marginal part of light that is suffering from the color disjunction is intercepted by an intercepting member, a light level observed on the screen differs from color to color. Consequently, the margin of a partial image projected from the projector suffers coloring.

What is described in the Patent Cooperation Treaty Publication No. WO95/25292 has something like the teeth of a comb formed for the purpose of reducing the light level of the marginal part. No description is made as to how to overcome a stepwise change in luminance derived from a plurality of light sources or a plurality of secondary light source images or coloring.

Consequently, when a plurality of light sources or a plurality of secondary light source images are used for illumination, a technology for alleviating the stepwise change in luminance or the coloring is desired in order to attain higher image quality.

SUMMARY OF THE INVENTION

Accordingly, an object of the present invention is to provide a multi-display device that alleviates a stepwise change in luminance or coloring caused by the shadow of the intercepting edge of an intercepting means which is derived from employment of a plurality of light sources or secondary light source images. Consequently, the multi-display device projects a higher-quality image.

In order to accomplish the above object, according to the present invention, there is provided a multi-display device having a plurality of projectors each of which projects a partial image on a screen so that the partial image and an adjoining partial image will overlap to have their margins superposed on each other. The plurality of partial images are synthesized to construct one image. Each projector consists mainly of an illuminating means, a display means, and a projecting optical system. The illuminating means radiates light using a plurality of light sources or secondary light source images arrayed two-dimensionally. The display means displays the partial images while being illuminated with light radiated from the illuminating means. The projecting optical system projects luminous flux representing the partial images displayed on the display means on the screen.

Moreover, the multi-display device includes an intercepting means. The intercepting means intercepts the marginal part of luminous flux that represents a partial image, and lowers the luminance in a portion of the partial image to be superposed on a portion of an adjoining partial image so that the luminance in the superposed portion of the partial images will be substantially identical to the luminance in the other portions thereof. The intercepting edge of the intercepting means has a plurality of continuous or discontinuous parts that are not parallel to the direction of rows of the plurality of light sources or secondary light source images.

Using the multi-display device in accordance with the present invention, the intercepting edge of the intercepting means has the plurality of continuous or discontinuous parts that are not parallel to the direction of the rows of the plurality of light sources or secondary light source images. Consequently, a stepwise difference in luminance caused by the shadow of the intercepting edge of the intercepting means can be alleviated, and a higher-quality image can be projected.

Moreover, according to the present invention, there is provided a multi-display device having a plurality of projectors each of which projects a partial image on a screen so that the partial image and an adjoining partial image will overlap to have their margins superposed on each other. The plurality of partial images are synthesized to construct one image. Each projector consists mainly of an illuminating means, a splitting means, red, green, and blue color display means, a luminous flux synthesizing means, and a projecting optical system. The illuminating means radiates light using a plurality of light sources or secondary light source images arrayed two-dimensionally. The splitting means splits light emanating from the illuminating means into three color light rays of red, green, and blue. The red, green, and blue color display means are illuminated with the light rays of red, green, and blue propagated from the splitting means, and display the partial images of red, green, and blue. The luminous flux synthesizing means synthesizes polarized light rays representing the partial images of red, green, and blue displayed on the red, green, and blue color display means. The projecting optical system projects light emanating from the luminous flux synthesizing means on the screen.

Moreover, the multi-display device includes an intercepting means. The intercepting means intercepts the marginal part of light representing a partial image on a light path linking the luminous flux synthesizing means and the screen. The intercepting means lowers the luminance in the portion of the partial image to be superposed on that of an adjoining partial image so that the luminance in the superposed portion of the partial images will be substantially identical to the luminance in the other portions thereof that are not superposed on each other. The intercepting means has a sheet polarizer. The sheet polarizer is placed so that an axis of polarization thereof will intersect a direction of polarization of an unnecessary color component ray, whereby color disjunction occurring in the margin of the partial image is corrected.

Using the multi-display device in accordance with the present invention, the intercepting means includes the sheet polarizer placed so that the axis of polarization thereof will intersect the direction of polarization of an unnecessary color component ray. Consequently, stepwise coloring caused by the shadow of the intercepting edge of the intercepting means can be alleviated, and a higher-quality image can be projected.

Furthermore, according to the present invention, there is provided a multi-display device having a plurality of projectors. Each projector projects a partial image on a screen so that the partial image and an adjoining partial image will overlap to have their margins superposed on each other. A plurality of partial images are synthesized to construct one image. Each projector consists mainly of an illuminating means, a splitting means, red, green, and blue color display means, a luminous flux synthesizing means, and a projecting optical system. The illuminating means radiates light using a plurality of light sources or secondary light source images arrayed two-dimensionally. The splitting means splits light radiated from the illuminating means into three color light rays of red, green, and blue. The red, green, and blue color display means are illuminated with the light rays or red, green, and blue propagated from the splitting means, and display the partial images of red, green, and blue. The luminous flux synthesizing means synthesizes the luminous flux representing the partial images of red, green, and blue displayed on the red, green, and blue color display means. The projecting optical system projects light propagated from the luminous flux synthesizing means on the screen.

Moreover, the multi-display device means intercepts the marginal part of the luminous flux representing a partial image on a light path linking the luminous flux synthesizing means and the screen. The intercepting means lowers the luminance in the portion of the partial image to be superposed on that of an adjoining partial image, so that the luminance in the superposed portion of the partial images will be substantially identical to the luminance in the other portions that are not superposed on each other.

The partial image is divided into a sub-partial image having one of the three colors of red, green, and blue and a sub-partial image having the other two colors. When the sub-partial images are disjoined, first color disjunction relevant to the one color and second color disjunction relevant to the two colors occur in the margins of the partial image.

Among the aforesaid plurality of projectors, adjoining projectors share the same superposed-portion area on the screen. One of the adjoining projectors projects a portion of a partial image suffering the first color disjunction at the superposed-portion area, and the other projector projects a portion of a partial image suffering the second color disjunction at the same superposed-portion area. Thus, the color disjunctions are canceled out in the superposed portion area.

Using the multi-display device in accordance with the present invention, the plurality of projectors are arranged so that one of the adjoining projectors that share the same superposed-portion area on the screen will project light that is suffering from the first color disjunction at the superposed-portion area, and the other projector will project light that is suffering from the second color disjunction at the superposed portion area. Thus, the color disjunctions are canceled out in the superposed-portion area. Consequently, stepwise coloring caused by the shadow of the intercepting edge of the intercepting means is alleviated, and a higher-quality image is projected.

BRIEF DESCRIPTION OF THE DRAWINGS

FIG. 3A to FIG. 3F show the relationship between a light source included in the projector in the first embodiment and the brightness on a radiated surface;

FIG. 19A to FIG. 19D show examples of placement of a lattice-like lens array employed in the first embodiment with the direction of rows of lenses varied;

DESCRIPTION OF THE PREFERRED EMBODIMENTS

Figure 1:
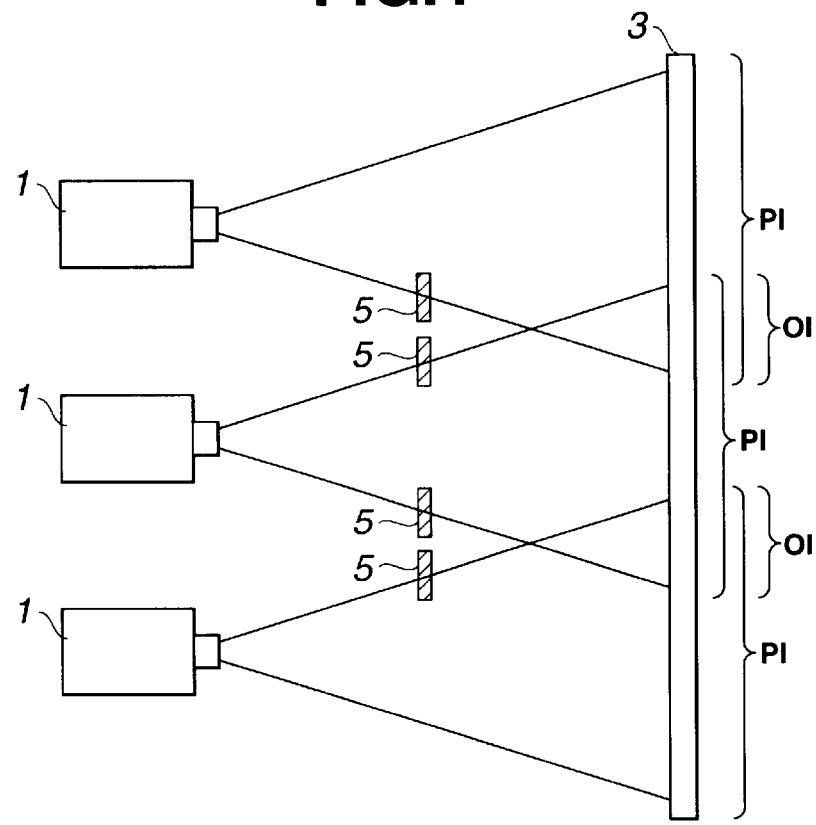
FIG. 1 is a plan view showing an example of the configuration of a multi-display device in accordance with a first embodiment of the present invention.

Referring to the drawings, embodiments of the present invention will be described below.

Figure 2:
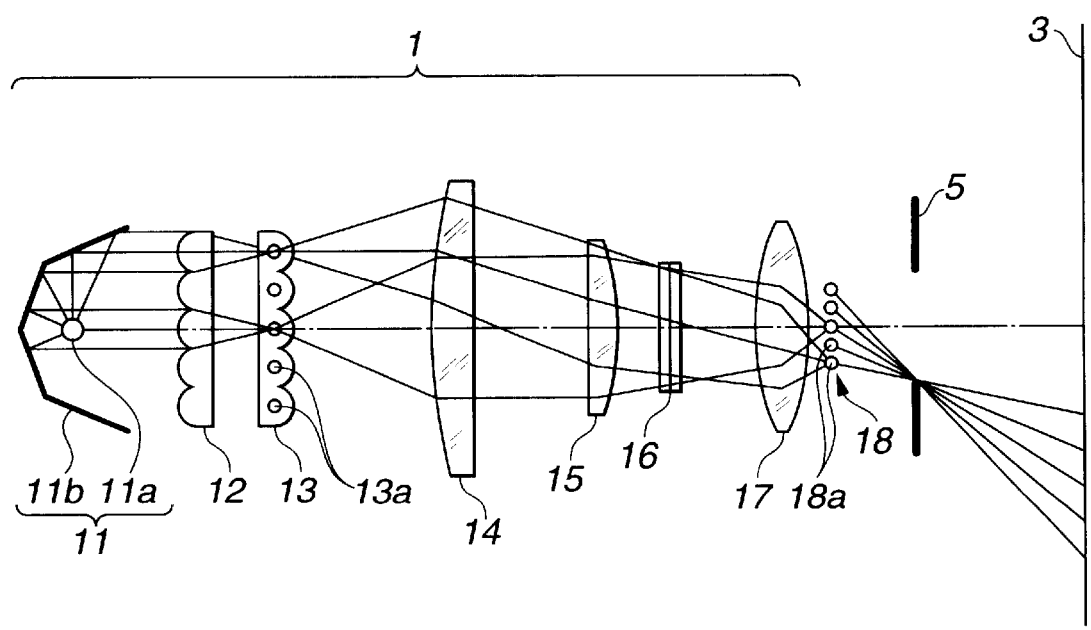
FIG. 2 laterally shows the internal optical elements constituting a major portion of a projector employed in the first embodiment.
Figure 3A:
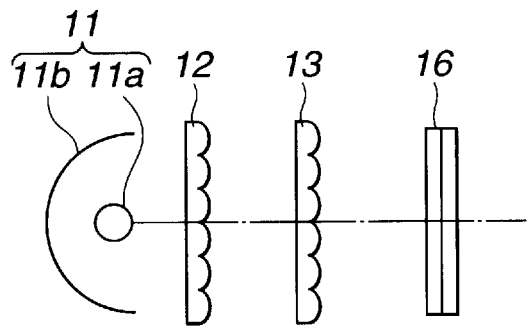
Figure 7:
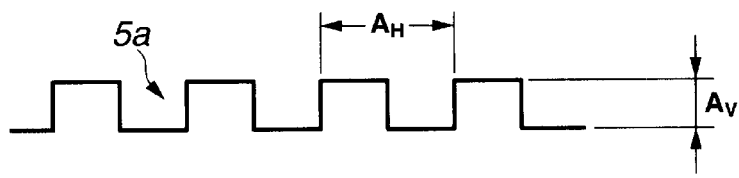
FIG. 7 shows the pitch between adjoining rectangular concave and convex parts of the intercepting edge of the sheet interceptor employed in the first embodiment, and the height of the convex parts thereof that is the depth of the concave parts thereof.
Figure 8:
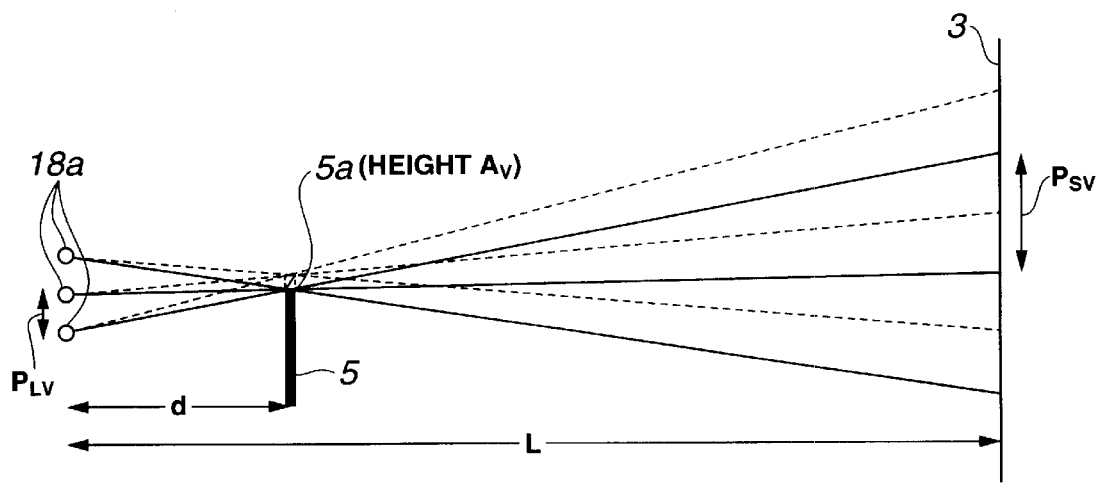
FIG. 8 shows the positional relationship among the secondary light source images formed on the image plane for an exit pupil and employed in the first embodiment, the sheet interceptor employed therein, and a screen employed therein.
Figure 9:
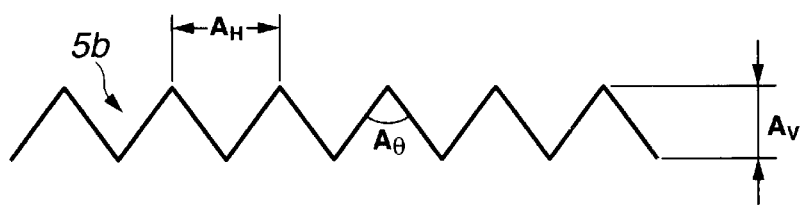
FIG. 9 shows the pitch between adjoining triangular concave and convex parts of the intercepting edge of the sheet interceptor employed in the first embodiment, and the height of the triangular convex parts thereof that is the depth of the concave parts thereof.
Figure 10:
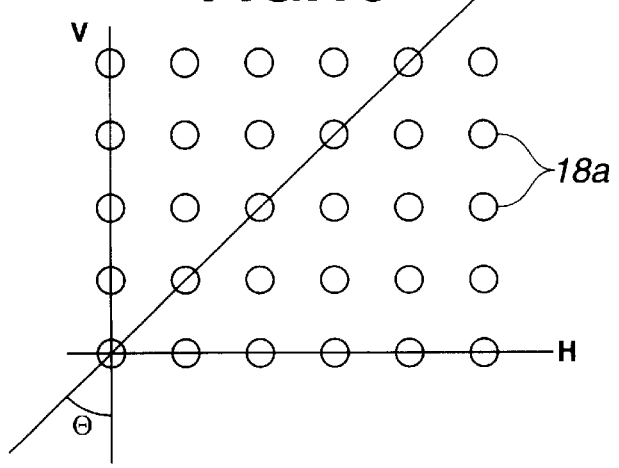
FIG. 10 shows an angle or a diagonal direction in a rectangular matrix of the secondary light source images that looks like a rectangular lattice and is employed in the first embodiment.
Figure 12:
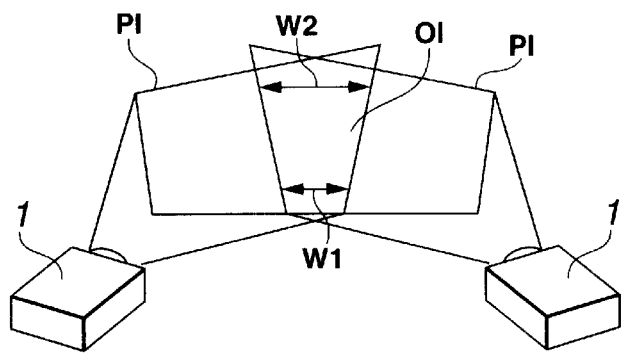
FIG. 12 shows the superposed portion of the partial images projected obliquely on the screen from the projectors employed in the first embodiment.
Figure 13:
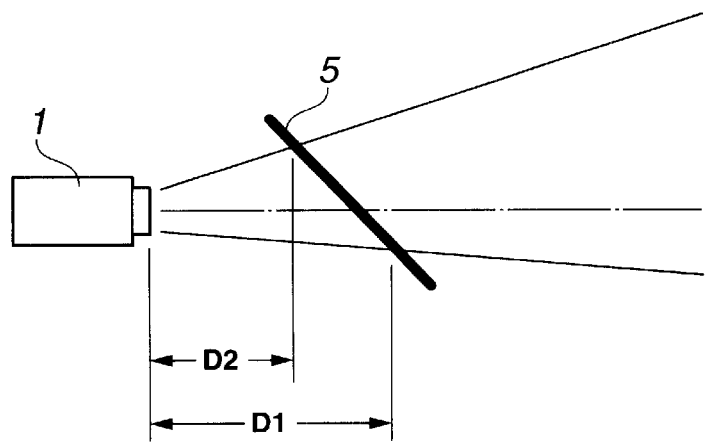
FIG. 13 laterally shows an example of placement of a sheet interceptor adopted when a partial image is projected obliquely according to the first embodiment.
Figure 14:
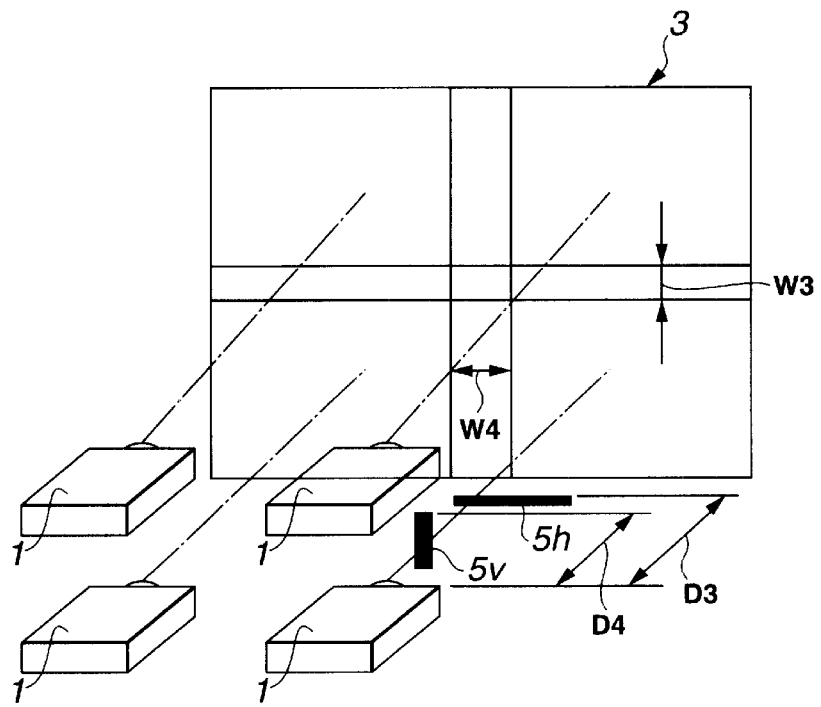
FIG. 14 shows a difference in width between a superposed-portion area shared by right and left adjoining projectors employed in the first embodiment and a superposed-portion area shared by up and down adjoining projectors employed therein.
Figure 15:
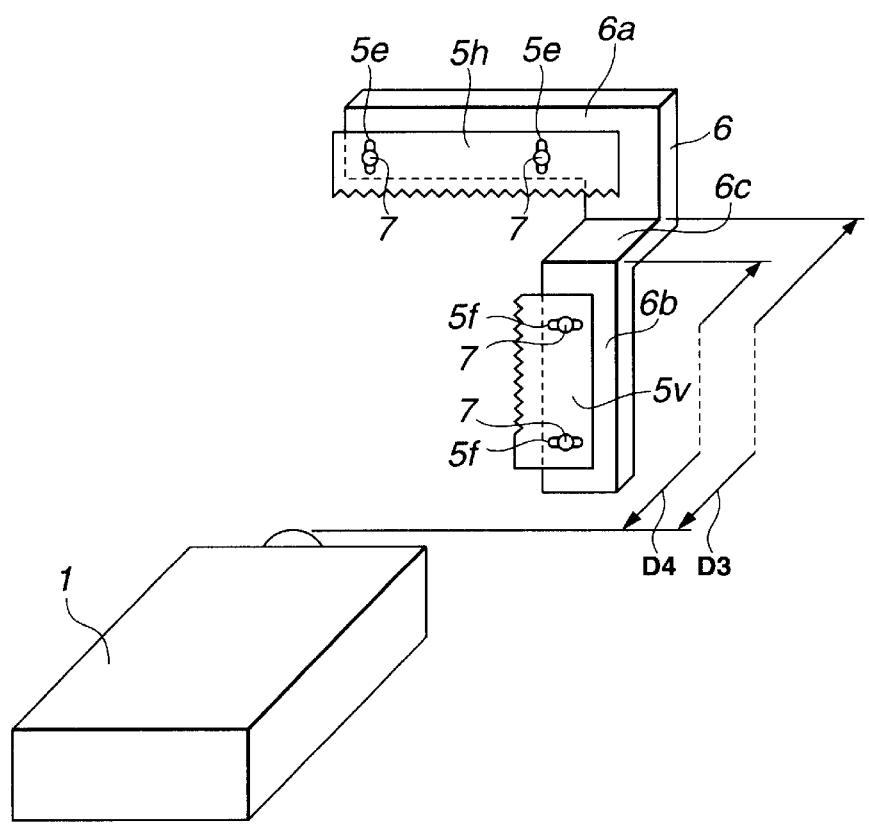
FIG. 15 is a perspective view showing an example of placement of a sheet interceptor that is adopted in the case shown in FIG. 14.
Figure 16:
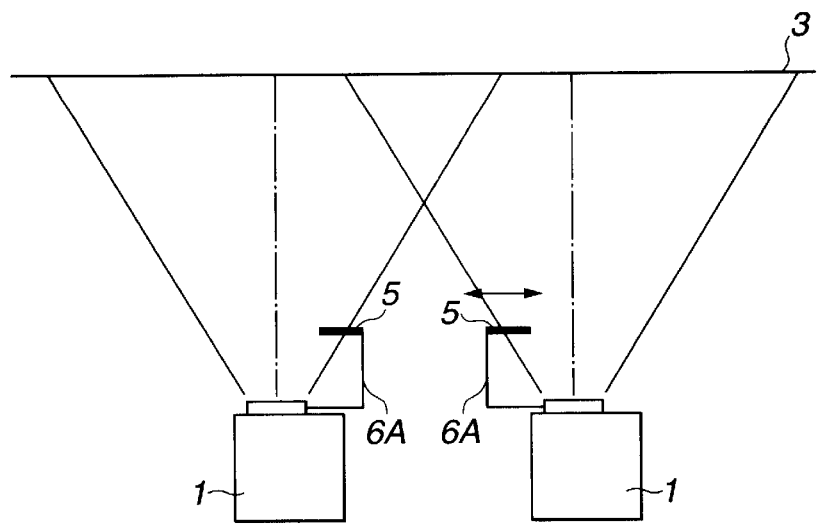
FIG. 16 is a plan view showing projectors each integrated with a sheet interceptor according to the first embodiment.
Figure 17:
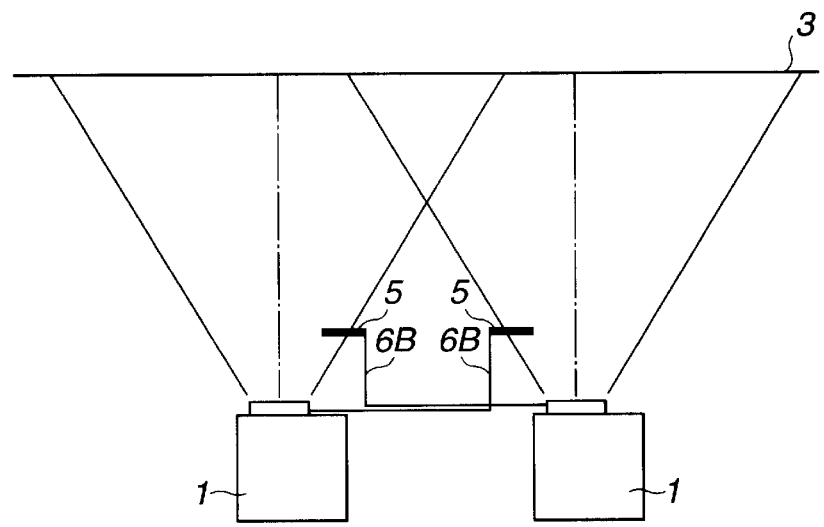
FIG. 17 is a plan view showing adjoining projectors each integrated with a sheet interceptor that intercepts light projected from an adjoining projector according to the first embodiment.
Figure 18:
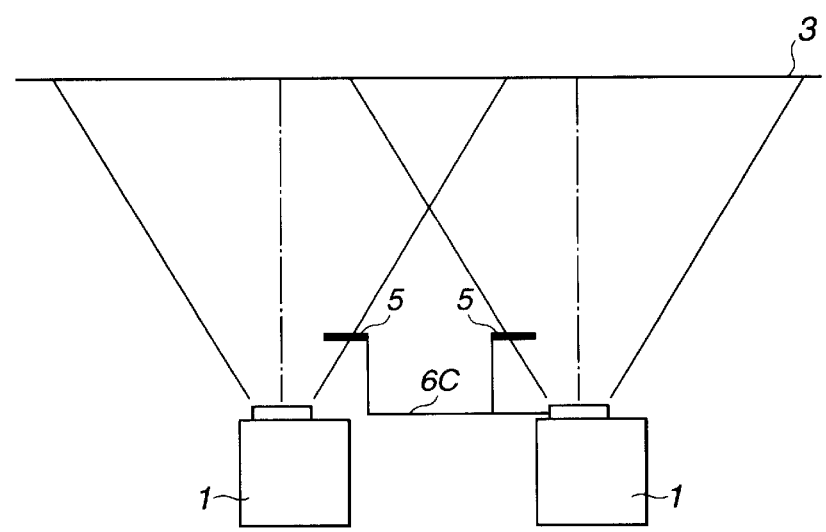
FIG. 18 is a plan view showing a plurality of projectors one of which is integrated with sheet interceptors that intercept light rays projected from the projectors according to the first embodiment.

FIG. 1 to FIG. 19 show a first embodiment of the present invention. FIG. 1 is a plan view showing an example of the configuration of a multi-display device. FIG. 2 laterally shows the internal optical elements constituting a major portion of a projector. FIG. 3 shows the relationship between a light source included in the projector and the brightness on a radiated surface. FIG. 4 shows an example of placement of a sheet interceptor on a light path extending from the inside of the projector to a screen. FIG. 5A to FIG. 5D show examples of the shape of an alternately concave and convex intercepting edge of a sheet interceptor. FIG. 6A to FIG. 6D show examples of a material made into a sheet interceptor. FIG. 7 shows the pitch between adjoining rectangular concave and convex parts of the intercepting edge of the sheet interceptor, and the height of the convex parts thereof, that is, the depth of the concave parts thereof. FIG. 8 shows the positional relationship among secondary light source images on the image plane for an exit pupil, a sheet interceptor, and a screen. FIG. 9 shows the pitch between adjoining triangular concave and convex parts of the intercepting edge of the sheet interceptor, and the height of the convex parts thereof, that is, the depth of the concave parts thereof. FIG. 10 shows and angle of a diagonal direction of a dot matrix of secondary light source images that looks like a rectangular lattice. FIG. 11 shows the relationship between the distance of a sheet interceptor from a projector and a degree of attenuation to which the luminance in a margin of a partial image attenuates. FIG. 12 shows the superposed portion of images projected obliquely on the screen from projectors. FIG. 13 laterally shows an example of placement of a sheet interceptor adopted when a partial image is projected obliquely. FIG. 14 shows a difference in width between superposed portion of partial images projected from laterally adjoining projectors and superposed portion of partial images projected from vertically adjoining projectors. FIG. 15 is a perspective view showing an example of placement of a sheet interceptor adopted in the case shown in FIG. 14. FIG. 16 is a plan view showing projectors each integrated with a sheet interceptor. FIG. 17 is a plan view showing adjoining projectors each integrated with a sheet interceptor that intercepts light projected from an adjoining projector. FIG. 18 is a plan view showing a plurality of projectors one of which is integrated with sheet interceptors that intercept light rays projected from the projectors. FIG. 19A to FIG. 19D show examples of placement of a lattice-like lens array with the direction of rows of lens varied.

The multi-display device has, for example, three projectors 1 as shown in FIG. 1. When the projectors 1 project partial images PI on a screen 3, the partial images PI are projected so that adjoining partial images will overlap to have margins thereof superposed on each other as superposed portion OI. The plurality of partial images PI is synthesized to construct one image.

Furthermore, a sheet interceptor 5 that is an intercepting means for reducing a light level to prevent the luminance in the superposed portion OI from rising due to superposition of light rays is placed to intervene in a light path along which light reaches an area on which the superposed portion OI lies. Consequently, the luminance in the superposed portion OI becomes nearly identical to the luminance in the other portions of the partial images that are not superposed on each other.

Herein, a rear-projection type multi-display device that enables viewing of an image on the screen 3 from a side opposite to the projectors 1 is taken for instance. Alternatively, a front-projection type multi-display device that enables viewing of an image from the same side as the projectors will do.

Next, the components of the projector 1 will be described with reference to FIG. 2.

The projector 1 includes an illumination device 11 that has a reflector 11b which reflects illumination light emanating from a substantially dot-like light source 11a. Light radiated from the illumination device 11 is relayed by a first lattice-like lens array 12 and converged on a second lattice-like lens array 13 as a first secondary light source images 13a arrayed in the form of a lattice-like matrix.

The first secondary light source images 13a are conjugate to the light source 11a. In more detail, the first secondary light source images 13a are equivalent to images of the light source 11a that are comparable to the elements of, for example, a rectangular (or square) matrix.

The first secondary light source images 13a converged on the second lattice-like lens array 13 fall on a display device 16 that is a display means realized with a transmissive liquid crystal display (transmissive LCD) or the like via illumination lenses 14 and 15. The display device 16 displaying an image is thus illuminated.

Consequently, an illuminating means is composed of the illumination device 11, the first lattice-like lens array 12, the second lattice-like lens array 13, and the illumination lenses 14 and 15.

Luminous flux representing the image displayed on the illuminated display device 16 is propagated via a projection lens 17 that is a projecting optical system. The luminous flux then passes through the image plane 18 for an exit pupil. At this time, a secondary light source images 18a of the light source 11a are converged on the exit-pupil image plane 18.

The second secondary light source images 18a are conjugate to the light source 11a and the first secondary light source images 13a alike.

The luminous flux has a marginal part thereof intercepted by a sheet interceptor 5, and is then converged on the screen 3.

Now, the illuminating means for forming the plurality of the secondary light source images 13a will be described with reference to FIG. 3A to FIG. 3F.

Figure 3D:
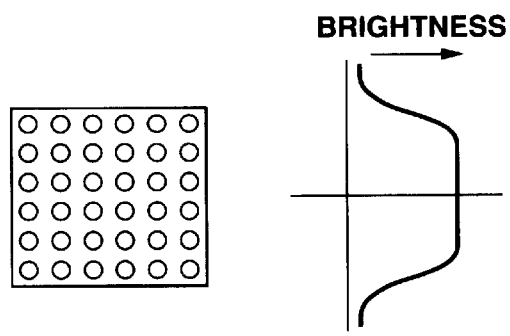
Figure 3D:
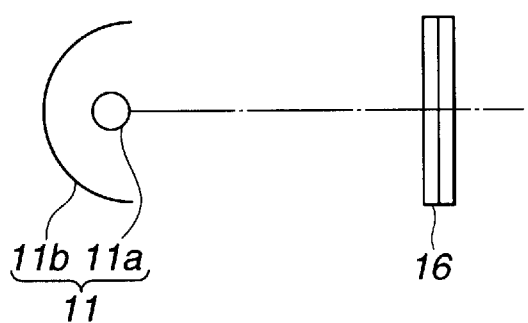
Figure 3E:
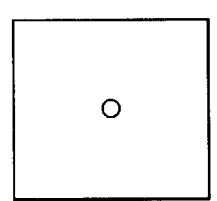
Figure 3F:
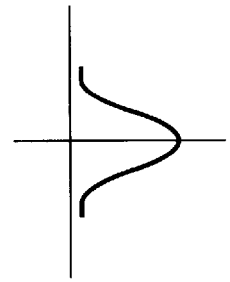
Figure 4:
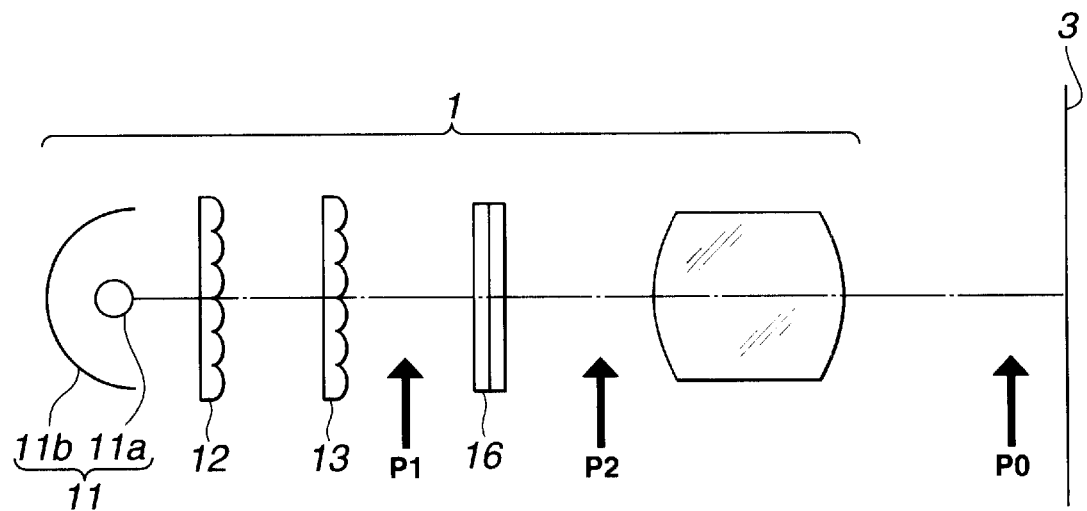
FIG. 4 shows an example of placement of a sheet interceptor on a light path extending from the inside of the projector employed in the first embodiment to a screen employed therein.

As described in relation to the drawbacks the present invention attempts to overcome, when the illumination device 11 having the dot-like light source 11a like the one shown in FIG. 3D is used to illuminate the display device 16, only a dot-like light source image like the one shown in FIG. 3E is used to illuminate the display device. Consequently, the luminance in the center of a radiated surface of the display device may get, as shown in FIG. 3F, higher than the luminance in the surrounding area of the radiated surface.

Therefore, the first lattice-like lens array 12 and the second lattice-like lens array 13 are, as shown in FIG. 3A, used to produce a plurality of secondary light source images from light emanating from the dot-like light source 11a included in the illumination device 11. The plurality of secondary light source images are arrayed on a planar basis (in the form of a lattice, or in other words, in the form of a dot matrix). Consequently, the display screen of the display device 16 can be illuminated nearly uniformly, and uniform brightness is attained all over the screen.

The sheet interceptor 5 may be located at any of positions shown in FIG. 4 on a light path extending from the inside of the projector 1 to the screen 3.

Specifically, the sheet interceptor 5 may be located at an appropriate position P1 on a light path linking the second lattice-like lens array 13 and the display device 16. The sheet interceptor 5 may be located at an appropriate position P2 on a light path linking the display device 16 and a photography lens 17. Otherwise, the sheet interceptor 5 may be located at an appropriate position P0 on a light path linking the photography lens 17 and the screen 3. If the sheet interceptor 5 is located at the position P1 or P2, it means that the sheet interceptor 5 is placed inside the projector 1. If the sheet interceptor 5 is located at the position P0, it means that the sheet interceptor 5 is placed outside the projector 1.

Incidentally, the sheet interceptor 5 may be placed between the first lattice-like lens array 12 and the second lattice-like lens array 13. However, since the first and the second lattice-like lens arrays 12 and 13 are often spatially close to each other, a position between the first and the second lattice-like lens arrays 12 and 13 may be inappropriate.

Next, the shape of the sheet interceptor 5 will be described with reference to FIG. 5A to FIG. 5D.

Figures 5A, 5B, 5C, 5D:
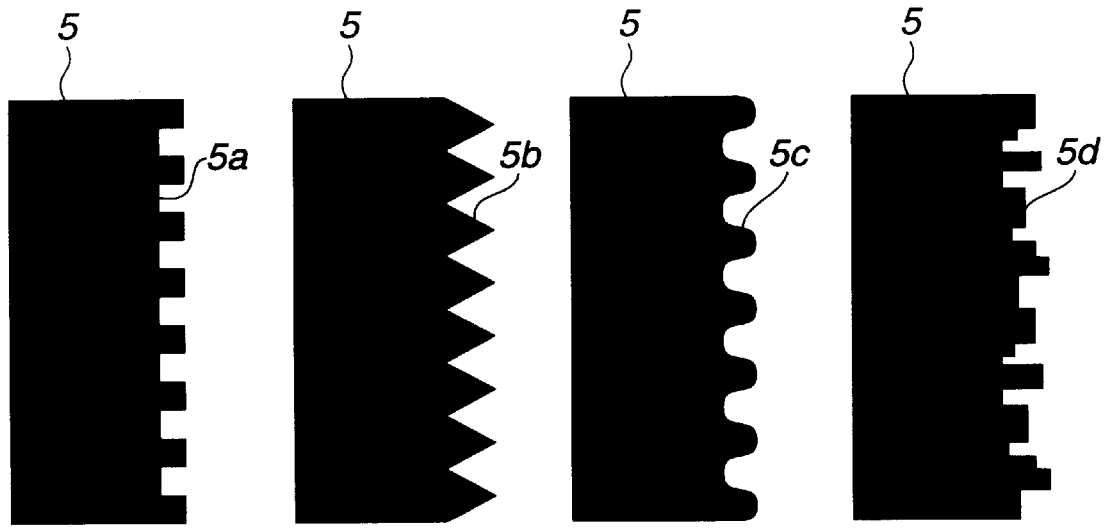
FIG. 5A to FIG. 5D show examples of the shape of an alternately concave and convex intercepting edge of a sheet interceptor employed in the first embodiment.

The sheet interceptor 5 has an intercepting edge that first intervenes in the marginal part of light representing a partial image. The intercepting edge of the sheet interceptor 5 is shaped to be alternately concave and convex. For example, the intercepting edge may be an intercepting edge 5a having rectangular concave and convex parts regularly alternated as shown in FIG. 5A. The intercepting edge may be an intercepting edge 5b having triangular concave and convex parts regularly alternated as shown in FIG. 5B. The intercepting edge may be an intercepting edge 5c having wavy concave and convex parts regularly alternated as shown in FIG. 5C. The wavy concave and convex parts are outlined like, for example, a sine wave or an arc. Otherwise, the intercepting edge may be an intercepting edge 5d having concave and convex parts formed randomly as shown in FIG. 5D.

FIG. 5A to FIG. 5D show mere examples. The intercepting edge of the sheet interceptor 5 may have concave and convex parts of any other shape.

Moreover, in order to present a material to be made into the sheet interceptor 5, FIG. 6A to FIG. 6D show examples of the sheet interceptor 5 made of different materials.

Figures 6A, 6B, 6C, 6D:
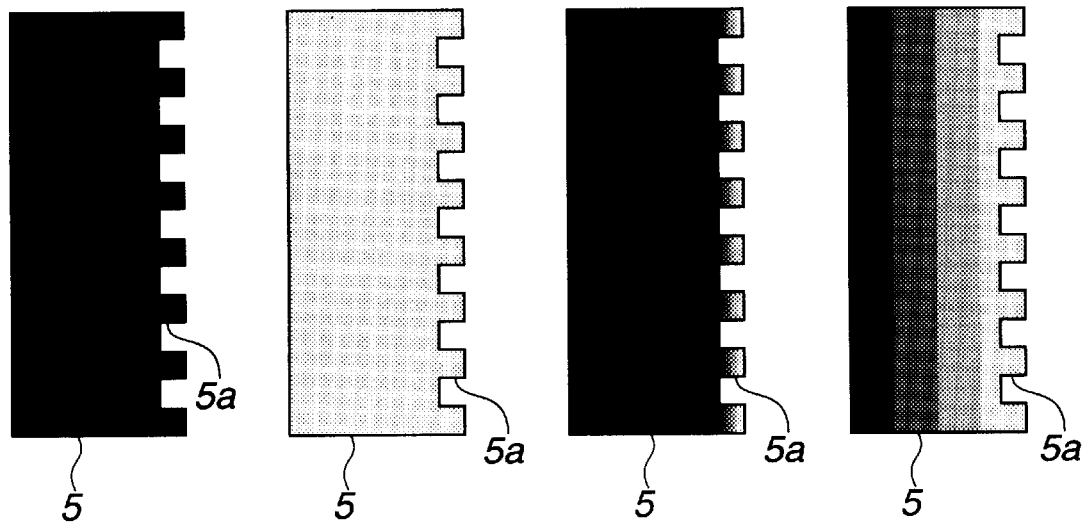
FIG. 6A to FIG. 6D show examples of a material to be made into the sheet interceptor employed in the first embodiment.

Specifically, a fully interceptive material may be made into the sheet interceptor 5 as shown in FIG. 6A. Preferably, the surface should be black and finished to be mat.

A translucent material exhibiting an appropriate transmittance may be made into the sheet interceptor 5 as shown in FIG. 6B. A neutral density (ND) filter that lowers a light level alone without changing a balance of colors is presented as a concrete example. Moreover, an ND filter exhibiting any desired transmittance can be adopted depending on the design of an optical system.

Moreover, a material whose transmittance varies continuously so that a sheet interceptor made of this material will change its transmittance towards the intercepting edge 5a thereof as shown in FIG. 6C. More particularly, the transmittance gets higher towards the tips of the convex parts, and gets lower towards the opposite side. A gradation ND filter is presented as a concrete example. Similarly to the foregoing ND filter, a gradation ND filter whose transmittance varies in a desired manner may be adopted. In FIG. 6C, the transmittance of the intercepting edge alone continuously varies. Alternatively, the transmittance of the sheet interceptor 5 as a whole may be varied continuously.

Furthermore, a material whose transmittance varies stepwise so that a sheet interceptor made of this material will change its transmittance towards the intercepting edge 5a may be made into the sheet interceptor 5 as shown in FIG. 6D. As mentioned above, the transmittance gets higher towards the tips of the convex parts and gets lower towards the opposite side. A stepped ND filter is presented as a concrete example. Similarly to the aforesaid filters, a stepped ND filter whose transmittance can be varied in desired steps can be adopted.

The materials described in conjunction with FIG. 6A to FIG. 6D has been described on the assumption that the sheet interceptor 5 has the shape shown in FIG. 5A. Needless to say, the materials may be adopted for the sheet interceptor 5 having any other shape.

Moreover, a combination of some of the aforesaid materials may be adopted to make the sheet interceptor 5.

Next, referring to FIG. 7 and FIG. 8, the size of the concave and convex parts of the intercepting edge 5a of the sheet interceptor 5 will be described below.

For example, the intercepting edge 5a shown in FIG. 5A has the concave and convex parts regularly alternated with a predetermined pitch between adjoining parts. As shown in FIG. 7, the height of the convex parts, or in other words, the depth of the concave parts shall be $A_V$ and the pitch between adjoining concave and convex parts shall be $A_H$.

As shown in FIG. 8, the interval in the direction of $A_V$ between adjoining ones of the plurality of secondary light source images 18a compared to the elements of a rectangular (or square) matrix shall be $P_{LV}$, and the interval in the direction of $A_H$ between them shall be $P_{LH}$. Furthermore, the distance of the sheet interceptor 5 from the plurality of secondary light source images 18a shall be d, and the distance of the screen 3 from the plurality of secondary light source images 18a shall be L. From the geometric relationship shown in FIG. 8, it is inferred under what conditions a projection of the alternately concave and convex intercepting edge 5a produced with each secondary light source image 18a is displaced by a half phase. Namely, the conditions are given as follows:

$$A_V = (d \times P_{SV})/(2L) \quad (1)$$

$$A_H = (d \times P_{SH})/(2L)$$

where $P_{SV}$ denotes the length of the interval $P_{LV}$ in the direction of $A_V$ between adjoining ones of the secondary light source images which are observed when the secondary light source images are projected on the screen 3, and $P_{SH}$ denotes the length of the interval $P_{LH}$ in the direction of $A_H$ between adjoining ones of the secondary light source images which is observed when the secondary light source images are projected on the screen 3.

$P_{SV}$ and $P_{SH}$ are expressed using $P_{LV}$ and $P_{LH}$ in terms of the geometric relationship shown in FIG. 8 as follows:

$$P_{SV} = (L-d) \times P_{LV}/d \quad (2)$$

$$P_{SH} = (L-d) \times P_{LH}/d$$

When the expressions (2) are assigned to the expressions (1), $A_V$ and $A_H$ are expressed as follows:

$$A_V = k \times P_{LV} \quad (3)$$

$$A_H = k \times P_{LH}$$

where the constant k is given as follows:

$$k = (L-d)/2L \quad (4)$$

The constant k is determined with the positional relationship among the image plane for an exit pupil 18, the sheet interceptor 5, and the screen 5.

The present applicant has experimentally discovered the fact described below. Namely, when a projection of the alternately concave and convex intercepting edges 5a formed with each secondary light source image 18a on the screen 3 is displaced by a half phase, or anyhow, when $A_V$ and $A_H$ fall within the predetermined ranges presented blow, a streaky distribution of luminance values on the screen is alleviated. Consequently, a change in luminance occurs more smoothly in the margin of a partial image.

$$(1/2) \times k P_{LV} < A_V < (3/2) \times k P_{LV} \quad (5)$$

$$(1/2) \times k P_{LH} < A_H < (3/2) \times k P_{LH}$$

The aforesaid expressions (1) to (5) are applicable even when the intercepting edge shaped to be alternately concave and convex may be the intercepting edge 5b having the triangular concave and convex parts as shown in FIG. 5B.

In this case, the height $A_V$ of the convex parts, that is, the depth of the concave parts and the pitch $A_H$ between adjoining concave and convex parts are defined as shown in FIG. 9.

When the concave and convex parts are triangular, the apex angle $A\theta$ of each convex part is determined to have the relationship expressed below to an angle $\Theta$ defined relative to a diagonal direction of the array of the secondary light source images 18a in the form of a rectangular matrix (see FIG. 10). Namely, $$(A\theta/2) < 0.99, \ 1.1\Theta < (A\theta/2) \quad (6)$$

Consequently, the streaky distribution of luminance values is further alleviated.

Assume that a basic array of secondary light source images is an array in which a lengthwise interval between adjoining secondary light source images is $P_{LH}$ and a sideways interval between them is $P_{LV}$, and the basic array is formed in a rectangular matrix. In this case, the secondary light source images 18a are arrayed with an interval $(P_{LH}{}^2 + P_{LV}{}^2)^{(1/2)}$ (where A denotes a power) kept between adjoining secondary light source images juxtaposed in a diagonal direction. The diagonal direction is determined to disagree with the directions of the slopes of the concave and convex parts of the intercepting edge 5b. The diagonal direction is thus made out of phase with the directions of the slopes. Eventually, a belt-shaped distribution of luminance values is blurred.

Thus, consideration is taken into a zero-rank effect, that is, an effect given by the basic array and a first-rank effect exerted in relation to a diagonal direction. This results in a smoother change in luminance.

The coordinates representing a dot in a dot matrix, may be, for example, (1, 2) or (2, 1). Since an array of secondary light source images formed in a higher-order matrix is conceivable, a higher-rank effect may be expected.

Furthermore, the aforesaid expressions (1) to (5) may be adapted to the sheet interceptor 5 having the intercepting edge 5c shown in FIG. 5C. In general, when the intercepting edge has the concave and convex parts alternated regularly with the height of the convex parts or the depth of the concave parts set to $A_V$ and the pitch between adjoining concave and convex parts set to $A_H$, the expressions (1) to (5) are adaptable.

When the intercepting edge shaped to be alternately concave and convex has, like the intercepting edge 5d shown in FIG. 5D, the concave and convex parts randomly formed, an average of the heights of the convex parts or the depths of the concave parts is set to $A_V$. An average of the pitches between the adjoining parts is set to $A_H$. Consequently, the expressions (1) to (5) are adaptable as they are.

Figure 11A:
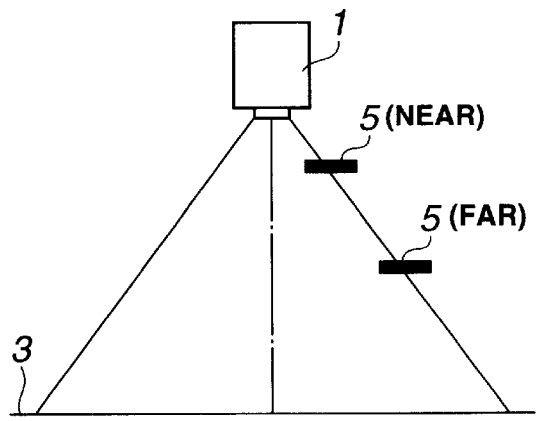
FIG. 11A and FIG. 11B show the relationship between the distance of the sheet interceptor from the projector employed in the first embodiment and a degree of attenuation to which the luminance in the margin of a partial image attenuates.
Figure 11B:
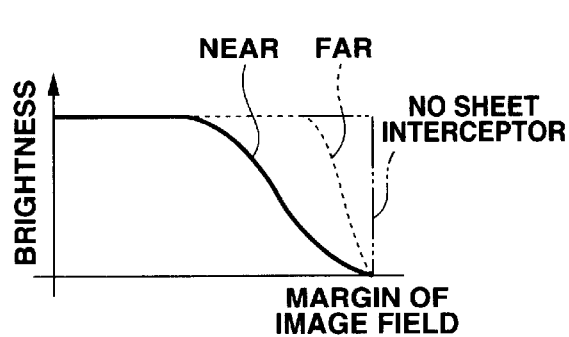

Referring to FIG. 11A and FIG. 11B, a change in luminance, which is expressed as a luminance curve, in the margin of a partial image will be described below. Herein, the plotted luminance value depends on the position of the sheet interceptor 5 in the optical-axis direction relative to the projector 1.

When the sheet interceptor 5 is located outside the projector 1, for example, located at a position P0 shown in FIG. 4, the placement of the sheet interceptor 5 can be highly freely determined. At this time, image quality can be optimized.

Depending on whether the sheet interceptor 5 is, as shown in FIG. 11A, located closely to the projector 1 or separately therefrom, a change in luminance detected in the margin of a partial image, that is, the shape of a luminance curve varies as shown in FIG. 11B.

Specially, when the sheet interceptor 5 is located closely to the projector 1, the luminance curve indicates that the luminance in the partial image decreases gradually towards the margin of the partial image. In contrast, when the sheet interceptor 5 is located separately from the projector 1, the luminance curve indicates that the luminance in the partial image decreases sharply near the margin thereof. In other words, the decrease in the luminance resembles a decrease therein occurring when no sheet interceptor is included.

The foregoing difference between the changes in luminance observed with the sheet interceptor located at different distances from the projector 1 can be applied as described below.

Assume that, as shown in FIG. 12, the projector 1 projects a partial image P1 obliquely on the screen 3 and the direction of projection is not parallel to a direction of projection in which an adjoining projector 1 projects a partial image. In this case, the width of the superposed portion OI of the partial images is not constant, but the lower width thereof is W1 and the upper width W2 thereof is larger than W1.

In this case, as shown in FIG. 13, the sheet interceptor 5 is inclined relative to the optical axis of the photography lens 17. Thus, the upper part of the sheet interceptor 5 that intercepts the upper part of a partial image corresponding to one of the large-width parts of the superposed portion OI is approached to the projector 1. The lower part of the sheet interceptor 5 that intercepts the lower part of a partial image corresponding to one of the small-width parts of the superposed portion OI is separated from the projector 1.

The distance D2 of the upper part of the sheet interceptor 5 from the projector 1 is adjusted so that the luminance in a partial image will change moderately over the width W2. Moreover, the distance D1 of the lower part of the sheet interceptor 5 from the projector 1 is adjusted so that the luminance in a partial image will change sharply over the width W1. Consequently, the luminance in the superposed portion OI having a varying width can be retained at nearly the same value as the luminance in the other portions of the partial images PI that are not superposed on each other. A synthetic image of the partial images therefore exhibits uniform luminance and appears natural without giving a feeling that something is wrong.

Moreover, as shown in FIG. 14, when the projectors 1 are arrayed lengthwise and sideways in order to project images, the width W3 of superposed portion of the partial images that adjoin lengthwise may differ from the width W4 of superposed portion of the partial images that adjoin sideways.

For example, the width W4 of the superposed portion of the sideways adjoining the partial images may be larger than the width W3 of the superposed portion of the lengthwise adjoining partial images. In this case, the distance D4 in the optical-axis direction of a sheet interceptor 5v, which intercepts the sideways marginal part of light, from the projector 1 is made smaller than the distance D3 therein of a sheet interceptor 5h, which intercepts the lengthwise marginal part of light, from the projector 1. Consequently, uniform luminance can be attained all over a screen image.

FIG. 15 shows a practical example of the structure of a sheet interceptor whose lengthwise and sideways positions can be varied. Specifically, FIG. 15 shows a sheet interceptor adopted for the lower left projector out of the four projectors shown in FIG. 4.

A sheet interceptor 5h for intercepting the lengthwise marginal part of light (upper marginal part) has a plurality of oblong holes 5e formed lengthwise, and fixed to a first support 6a of a supporting member 6 using screws 7. The position of the sheet interceptor 5h is adjustable within the width of the oblong holes 5e.

Moreover, a sheet interceptor 5v for intercepting the sideways marginal part of light (right marginal part) has a plurality of oblong holes 5f formed sideways, and fixed to a second support 6b of the supporting member 6 using screws 7. The position of the sheet interceptor 5v is adjustable within the length of the oblong holes 5f.

The supporting member 6 is a substantially L-shaped member having the first support 6a and the second support 6b joined with a step 6c between them. The length of the step 6c in the direction of the optical axis of the projector 1 is determined to be equal to a difference between distances D3 and D4 shown in FIG. 14.

Using the structure shown in FIG. 15, when the sheet interceptor 5h is separated by the distance D3 from the projector 1 or the sheet interceptor 5v is separated by the distance D4 from the projector 1, the other sheet projector is located at the predetermined position.

Furthermore, the sheet interceptors 5h and 5v are made movable in vertical directions and horizontal directions relative to the supporting member 6. Magnitudes by which the sheet interceptors 5h and 5v invade into luminous flux representing a partial image can therefore be adjusted.

Referring to FIG. 16 to FIG. 18, a structure for holding the sheet interceptor 5 at a predetermined position from the projector 1 will be described below.

Referring to FIG. 16, a sheet interceptor 5 is borne as an integral part by a supporting member 6A so that the sheet interceptor will retain a predetermined positional relationship to a projector 1 that projects a partial image to be intercepted by the sheet interceptor 5.

Thus, even when the position of the projector 1 is changed in order to shift the installation site of the multi-display device, the position of the sheet interceptor 5 relative to the projector 1 need not be adjusted again. Positional adjustment that must be performed after assembly can be achieved readily. In short, once the interval between adjoining projectors 1 and the interval between the projectors 1 and the screen are determined, these components are rearranged.

Referring to FIG. 17, a sheet interceptor 5 is borne as an integral part by a supporting member 6B so that the sheet interceptor 5 will retain a predetermined positional relationship to an adjoining projector 1. This projector 1 adjoins a projector 1 that projects a partial image to be intercepted by the sheet interceptor 5.

In general, the interval between adjoining projectors 1 is changed when the adjoining projectors 1 are approached to each other or separated from each other. In this case, the width of superposed portion of adjoining partial images increases or decreases. Consequently, a magnitude by which the sheet interceptor 5 invades into light must be adjusted based on the width of the superposed portion. In contrast, when the structure shown in FIG. 17 is adopted, if adjoining projectors approach each other, a magnitude by which the sheet interceptor 5 invades into luminous flux automatically increases. If the adjoining projectors 1 separate from each other, the magnitude by which the sheet interceptor 5 invades into luminous flux decreases automatically. Adjustment is thus automated, which is advantageous.

As shown in FIG. 18, a sheet interceptor 5 associated with one projector 1 and a sheet interceptor 5 associated with an adjoining projector 1 are borne as an integral part by a supporting member 6C. The supporting member 6C is fixed to one of the projectors 1.

Using the above structure, once the supporting member 6C bearing a plurality of sheet interceptors is fixed to one projector, light projected from a plurality of projectors can be intercepted. Consequently, the number of times by which attaching work is performed can be decreased and the costs of assembling can be reduced.

Herein, two sheet interceptors 5 are borne by one supporting member 6C. Alternatively, three or more sheet interceptors 5 may be borne by one supporting member.

FIG. 19A to FIG. 19D demonstrate by presenting examples that a belt-shaped distribution of luminance values in the margin of a partial image is alleviated with a change in the direction of rows of the lattice-like lens array relative to the intercepting edge of the sheet interceptor 5.

As shown in FIG. 19A, the lattice-like lens array 21 has a plurality of lenses 21a arrayed in the form of, for example, a rectangular (or square) matrix. Generally, the lattice-like lens array 21 is placed so that the direction of the rows of lenses will agree with the direction of the sides of a partial image that is rectangular and projected from the projector 1.

However, the secondary light source images propagated from the lattice-like lens array 2 having the lenses arrayed as mentioned above and being placed as mentioned above are used to illuminate the display device 16 on which an image is displayed. At this time, when the marginal part of luminous flux that is propagated as the secondary light source images is intercepted using an ordinary sheet interceptor whose intercepting edge is linear, a belt-shaped distribution of luminance values occurs in the margin of a projected partial image.

Referring to FIG. 19B, a lattice-like lens array 21A is inclined at an appropriate angle θ1 relative to a partial image projected from the projector 1. Even in this case, a belt-shaped distribution of luminance values in the margin of a partial image which is attributable to the employment of the plurality of secondary light source rays can be alleviated. Even if an ordinary sheet interceptor having a linear intercepting edge is employed, since the intercepting edge is inclined relative to the direction of the rows of lenses constituting the lattices lens array 21A, the secondary light source images are not arrayed in a direction perpendicular to the intercepting edge. Otherwise the secondary light source images may be arrayed in the direction perpendicular to the intercepting edge. However, since the array of the secondary light source images is formed in a matrix with higher-order than the basic array thereof, the belt-shaped distribution of luminance values is finely scattered. Consequently, the luminance in a partial image decreases smoothly towards the edge of the partial image.

In other words, the angle θ1 by which the lattice-like lens array 21A is inclined relative to the intercepting edge is preferably set to a value that does not manifest a low-order matrix comparable to the basic array of secondary light source images. For example, setting the angle θ1 to a value that causes the diagonal direction of the basic array to intersect the intercepting edge should be avoided. Specifically, assuming that the intercepting edge is linear and the basic array is formed in a square matrix, the angle θ1 is preferably not equal to 45°.

The lattice-like lens array 21A shown in FIG. 19B has the sides thereof inclined relative to the sides of the display device 16. The lattice-like lens array 21A is therefore designed to be large enough to cover a radiation range within which light is radiated to the display device 16. When the unnecessary corners of the lattice-like lens array 21A are removed, the remaining necessary part thereof is provided as a lattice-like lens array 21B shown in FIG. 19C.

The lattice-like lens array 21B has the direction of rows of lenses 21a thereof inclined by an angle θ2 relative to the sides of the lattice-like lens array 21B. The other features are nearly identical to those of the lattice-like lens array 21A shown in FIG. 19B.

Next, a lattice-like lens array 21C shown in FIG. 19D will be described. Even-numbered rows of lenses 21a and odd-numbered rows of lenses 21 are displaced to be deviated from each other by a half phase. In this case, the basic array of secondary light source images becomes triangular.

The employment of the lattice-like lens array 21C having the lenses 21a arrayed as mentioned above is useful in alleviating a belt-shaped distribution of luminance values caused by the sheet interceptor 5 that intercepts the right and left edges of a partial image.

Any of the lattice-like lens arrays shown in FIG. 19B, FIG. 19C, and FIG. 19D is adopted as the first and second lattice-like lens arrays 12 and 13 shown in FIG. 2. The first and second lattice-like lens arrays 12 and 13 are then placed with the directions of the rows of lenses matched between them. Consequently, even when a sheet interceptor having a linear intercepting edge is adopted as the sheet interceptor 5, a belt-shaped distribution of luminance values occurring in the margin of a partial image can be alleviated.

According to the first embodiment, since the intercepting edge of a sheet interceptor is formed to be alternately concave and convex, a belt-shaped distribution of luminance values in the margin of a partial image can be alleviated. Consequently, a higher-quality image can be projected.

Moreover, the concave and convex parts of the intercepting edge are designed so that the height or depth (otherwise, an average of heights or depths) or the pitch (or an average of pitches) will meet a predetermined condition. Consequently, a higher effect can be expected.

Moreover, assuming that first and second lattice-like lens arrays are formed in rectangular matrices, they are placed so that the direction of rows of lenses constituting each lens array will obliquely cross the intercepting edge of a sheet interceptor. Consequently, a belt-shaped distribution of luminance values in the margin of a partial image can be alleviated, and a higher-quality image can be projected.

Moreover, when the first and second lattice-like lens arrays are placed so that the diagonal direction of each array formed in a rectangular matrix will obliquely cross the intercepting edge of the sheet interceptor, a higher effect can be exerted.

A sheet interceptor is made of any or a combination of a fully interceptive material, a translucent material, a material whose transmittance continuously varies so that the sheet interceptor made of this material will change its transmittance towards the intercepting edge thereof, and a material whose transmittance varies stepwise so that the sheet interceptor made of this material will change its transmittance towards the intercepting edge thereof. Consequently, a change in luminance occurring in the margin of a partial image can be controlled properly.

Furthermore, a sheet interceptor can be placed on a light path linking the first or second lattice-like lens array and the screen. Therefore, the freedom of designing improves and image quality is optimized.

In addition, a sheet interceptor for intercepting the vertically marginal part of light and a sheet interceptor for intercepting the laterally marginal part of light are adopted in order to change the position of a projection lens in the direction of an optical axis. This makes it possible to cope with the varying width of superposed portion of partial images.

The plurality of sheet interceptors are integrated with each other and borne by a supporting member. It is therefore unnecessary to adjust the positions, at which the sheet interceptors are attached, one by one. This simplifies assembling work and adjusting work.

Moreover, when projectors obliquely project images on the screen, superposed portion of the images have a varying width. The varying width can be coped with once the sheet interceptor is inclined relative to the optical axis of the projection lens.

Furthermore, a sheet interceptor is borne as an integral part by a supporting member so that the sheet interceptor will have a predetermined positional relationship to a projector that projects a partial image to be intercepted by the sheet interceptor. Even if the position of the projector is changed, an intercepted field can be held constant.

A sheet interceptor is borne as an integral part by a supporting member so that the sheet interceptor will have a predetermined positional relationship to a projector adjoining a projector that projects a partial image to be intercepted by the sheet interceptor. Consequently, even when the width of superposed portion of the partial images is varied because of a change in the relative positions of the projectors, the variation of the width of the superposed portion can be coped with automatically.

Figure 20:
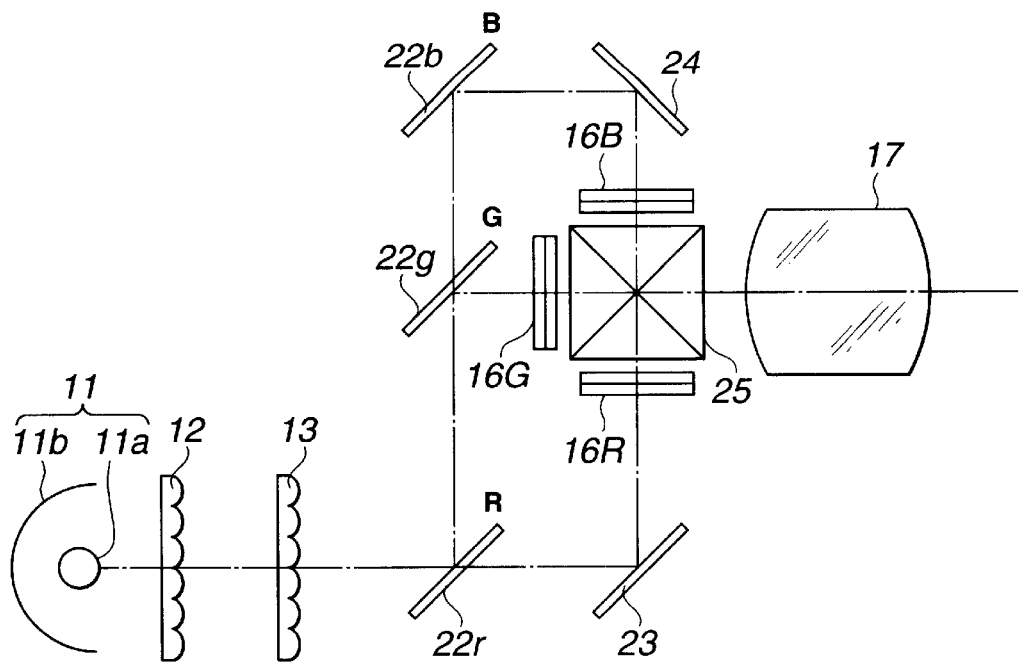
FIG. 20 shows the internal optical elements constituting a major portion of a triple-plate color projector employed in a second embodiment of the present invention.
Figure 21A:
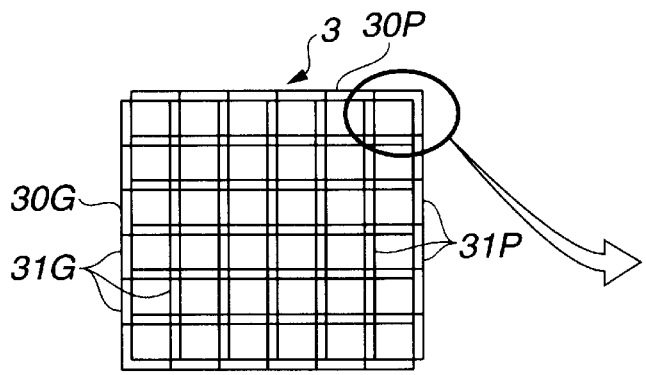
FIG. 21A and FIG. 21B show a partial image that is projected from projectors employed in the second embodiment which has green and purple disjoined.
Figure 21B:
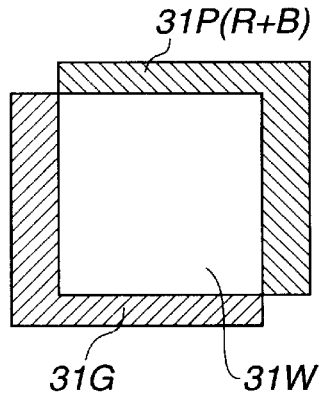
Figure 22:
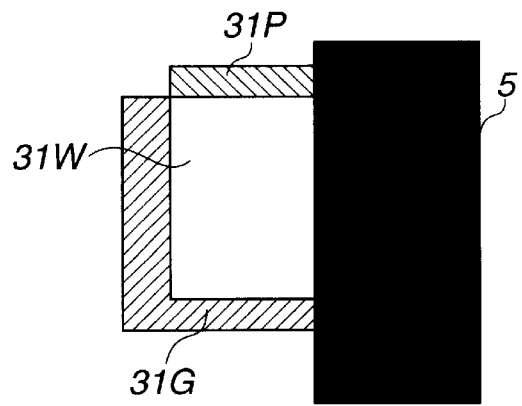
FIG. 22 shows interception of part of the partial image, which has green and purple disjoined, by means of a sheet interceptor employed in the second embodiment.
Figure 23:
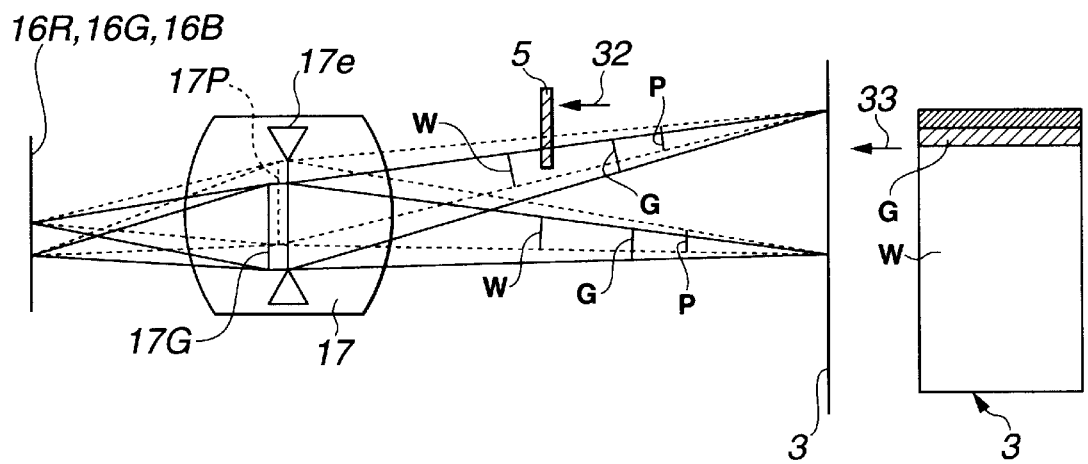
FIG. 23A and FIG. 23B show coloring occurring when the partial image whose green and purple are disjoined is intercepted by the sheet interceptor employed in the second embodiment.
Figure 24:
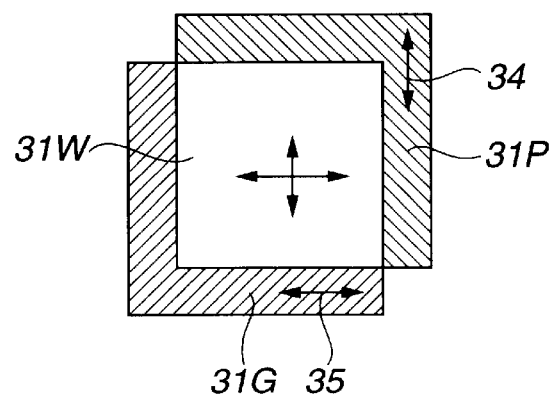
FIG. 24 shows directions of polarization in which part of light representing the partial image whose green and purple are disjoined is polarized.

FIG. 20 to FIG. 27 show a second embodiment of the present invention. FIG. 20 shows the internal optical elements constituting a major portion of a triple-plate color projector. FIG. 21A and FIG. 21B show partial images that are projected from projectors and that have green and purple thereof disjoined. FIG. 22 shows a partial image whose green and purple are disjoined and part of which is intercepted by a sheet interceptor. FIG. 23A and FIG. 23B show coloring occurring when a partial image whose green and purple are disjoined is intercepted by the sheet interceptor. FIG. 24 shows the directions of polarization occurring in part of light representing a partial image whose green and purple are disjoined. FIG. 25A and FIG. 25B show sheet interceptors whose axes of polarization are directed in order not to produce coloring. FIG. 26A, FIG. 26B, and FIG. 26C show examples of placement of projectors enabling colors-disjoined images to overlap so that colorings in the images will be canceled out. FIG. 27A and FIG. 27B show an example of a combination of colors-disjoined images whose colorings are canceled out in comparison with an example of a combination of colors-disjoined images whose colorings are not canceled out.

The same reference numerals as those employed in the first embodiment will be assigned to the components of the second embodiment identical to those of the first embodiment, and the description of the components will be omitted. A difference alone will be described mainly.

Projectors employed in the second embodiments are triple-plate color projectors.

As shown in FIG. 20, the illumination device 11 and the first and second lattice-like lens arrays 12 and 13 produce a plurality of secondary light source images. Thus, illumination light is radiated. The light first falls on a red light splitting dichroic mirror 22r that is a light splitting means. Red light R alone is transmitted by the red light splitting dichroic mirror 22r, and the other light components are reflected therefrom.

The red light R is reflected from a mirror 23, and propagated to a display device 16R that is a display means for displaying a red partial image, whereby the display device 16R is illuminated.

On the other hand, light reflected from the red light splitting dichroic mirror 22r is propagated to a green light splitting dichroic mirror 22g. Green light G alone is reflected from the green light splitting dichroic mirror 22g, and the remaining blue light B is transmitted thereby.

The green light G is propagated to a display device 16G that is a display means for displaying a green partial image, whereby the display device 16G is illuminated.

The blue light B transmitted by the green light splitting dichroic mirror 22g is reflected from a mirror 22b and a mirror 24, and then propagated to a display device 16B that is a display means for displaying a blue partial image. The display device 16B is thus illuminated.

Each luminous flux emanating from the display devices 16R, 16G, and 16B and representing the red, green, and blue partial images is synthesized by a dichroic prism 25 that is a luminous flux synthesizing means. The resultant synthetic light is projected on the screen 3 through the projection lens 17 that is a projecting optical system.

At this time, to the first embodiment, even in the present embodiment, the sheet interceptors 5 are placed on a light path linking, for example, the projection lens 17 and the screen 3 in order to intercept the marginal parts of the luminous flux representing partial images.

As mentioned above, the illumination light is split into red, green, and blue components, and display devices are placed on light paths of the red, green, and blue components. In this case, color disjunction may, as shown in FIG. 21A and FIG. 21B, occur in the marginal part of projected light. This is attributable to a difference in an optical length or a displacement of an exit pupil dependent on a wavelength.

Each of partial images projected on the screen 3 may be, as shown in FIG. 21A, split into a green partial image 30G and a purple partial image 30P (purple is a synthetic color of red and blue). Moreover, the positions at which the green and purple partial images are projected may be disjoined. Herein, the green partial image 30G is relatively displaced left downward, and the purple partial image 30P is relatively displayed right upward.

The partial images 30G and 30P are represented by light components 31G and 31P that are radiated as parts of each of the secondary light source images arrayed in the form of a dot matrix. The pairs of the light components 31G and 31P are arrayed in the form of the dot matrix.

The light components 31G and 31P overlap while being, as shown in FIG. 21B, displaced right upwards and left downwards respectively. Superposed portion of the light components 31G and 31P appear as a light component 31W that looks white when a white image is projected.

The light components 31G and 31P of light representing a partial image will be further described below.

For example, a sheet interceptor 5 is used to intercept the right-hand margins of the light components 31G and 31P. In this case, the light components 31G and 31P appear as shown in FIG. 22 that shows the sheet interceptor 5 from the direction of arrow 32 in FIG. 23A. For example, the purple light component 31P is largely intercepted. The balance of colors in the partial image represented by the light components is therefore broken, and a green light component occupies the partial image.

In other words, as shown in FIG. 23A, light rays radiated from the display devices 16R, 16G, and 16B form exit pupils at different positions. For example, the exit pupil of green light G is formed at a position 17G, and the exit pupil of purple light P (that is, synthetic light of red light R and blue light G) is formed at a position 17P.

Consequently, the green light G and purple light P are disjoined and separated from each other on a midway of light path (superposed portion of the green light and purple light appear so-called white light W). When the green light G and purple light P are focused on the screen 3, the balance of the colors is attained.

A sheet interceptor 5 is located at the position on the light path at which light is split into color light components. Greenish coloring appears in the margin of a partial image projected on the screen 3 as shown in FIG. 23B that shows the screen 3 seen from the direction of arrow 33.

Luminous flux synthesized to represent a partial image is transmitted by the display devices 16R, 16G, and 16B that are, for example, liquid crystal display devices. The aforesaid light components 31G and 31P are polarized. For example, as shown in FIG. 24, the light component 31P is polarized in the directions of arrows 34, and the light component 31G is polarized in the directions of arrows 35.

Consequently, a sheet interceptor whose axis of polarization is directed in order to permit reduction of light without breaking the balance of colors by making the most of the above polarization is adopted as a sheet interceptor 5.

Figure 25A:
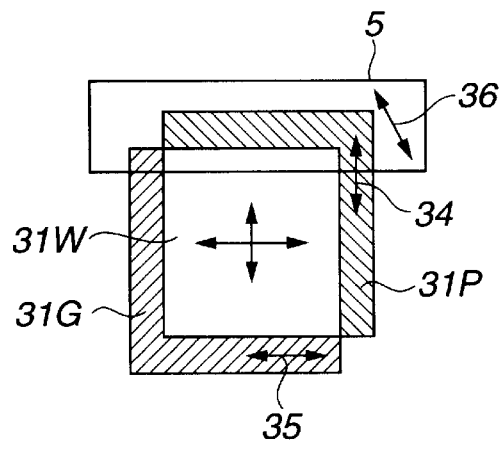
FIG. 25A and FIG. 25B show sheet interceptors whose axes of polarization are placed in directions that prevent coloring according to the second embodiment.

For example, when it is required to intercept the upper marginal part of light that is polarized in the directions shown in FIG. 24, a sheet interceptor whose axis of polarization is extended in the directions of arrow 36 shown in FIG. 25A is adopted as the sheet interceptors 5. The marginal part of light intercepted by the sheet interceptor 5 includes the light component 31W in which colors are balanced, the relatively large-level purple light component 31P, and the small-level green light component 31G. In order to balance the colors (that is, in order to cut the green light G and transmit the purple light P), the directions of arrows 36 are determined by tilting the arrows 35 towards the arrows 34.

Figure 25B:
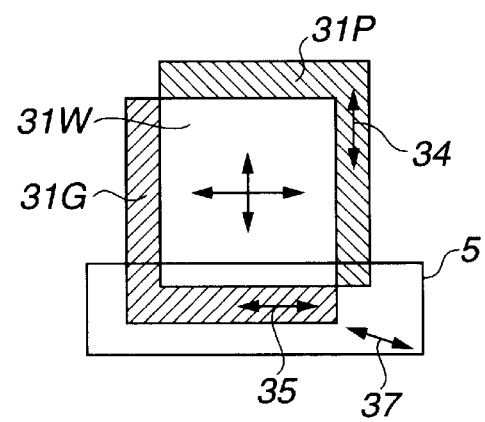

When it is required to intercept the lower marginal part of the light polarized in the directions shown in FIG. 24A, a sheet interceptor 5 whose axis of polarization is directed as indicated with arrows 37 in FIG. 25B. The marginal part of light being intercepted by the sheet interceptor 5 includes the light component 31W in which colors are balanced, the relatively large-level green light component 31G, and the small-level purple light component 31P. In order to balance the colors of the partial image represented by the light (that is, in order to cut purple light P and transmit green light G), the directions of arrows 37 are determined by tilting the arrows 35 a bit towards the arrows 34.

In order to correct the balance of colors of a partial image whose margins suffer from color disjunction as shown in FIG. 21A and FIG. 21B, any of the aforesaid sheet polarizers may be adopted as a sheet interceptor. Otherwise, a means shown in FIG. 26A to FIG. 26C may be adopted.

Figure 26A:
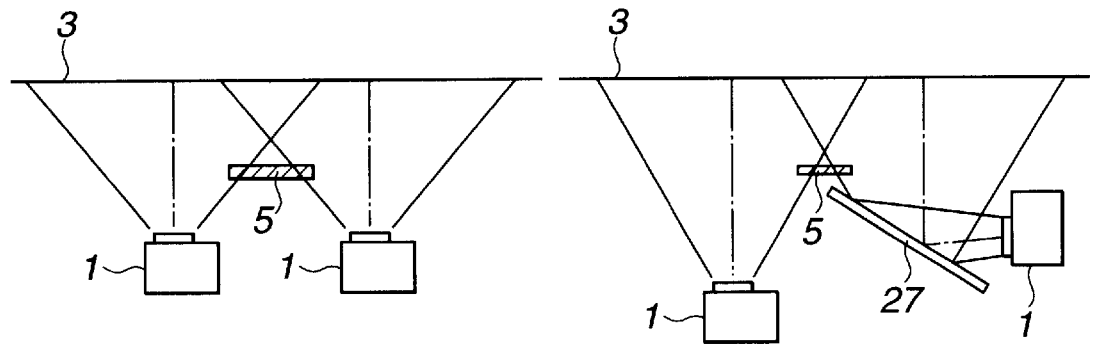
FIG. 26A to FIG. 26C show examples of placement of projectors effective in superposing colors-disjoined images on each other so as to cancel out colorings according to the second embodiment.

Specifically, FIG. 26A shows adjoining projectors 1 arranged so that color disjunction in partial images projected on the screen 3 will extend in the same direction. When the projectors are arranged this way, the light components 31P and 31G of light rays representing two partial images are, as shown in FIG. 27, displaced in the same directions between the partial images. The light rays representing the partial images are intercepted using a sheet interceptor 5. Consequently, the partial image projected from the left projector becomes greenish because the purple light component (P) out of the light representing the partial image is mainly intercepted. The partial image projected from the right projector is tinged with purple because the green light component (G) is mainly intercepted. However, since the partial images are overlapped each other, the colors are balanced.

Figure 26B:
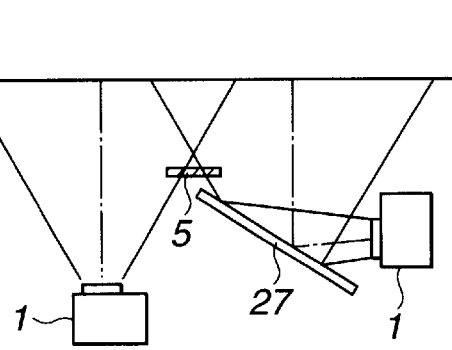
Figure 27A:
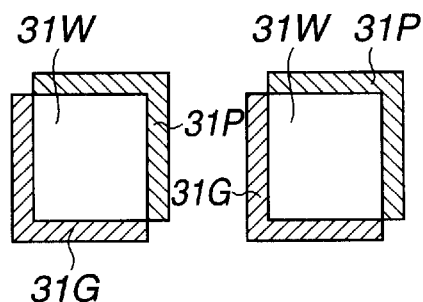
FIG. 27A and FIG. 27B show an example of a combination of colors-disjoined images enabling canceling out of colorings in comparison with an example of a combination of colors-disjoined images intensifying colorings.
Figure 27B:
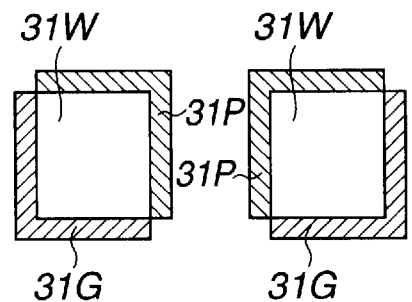
Figure 28:
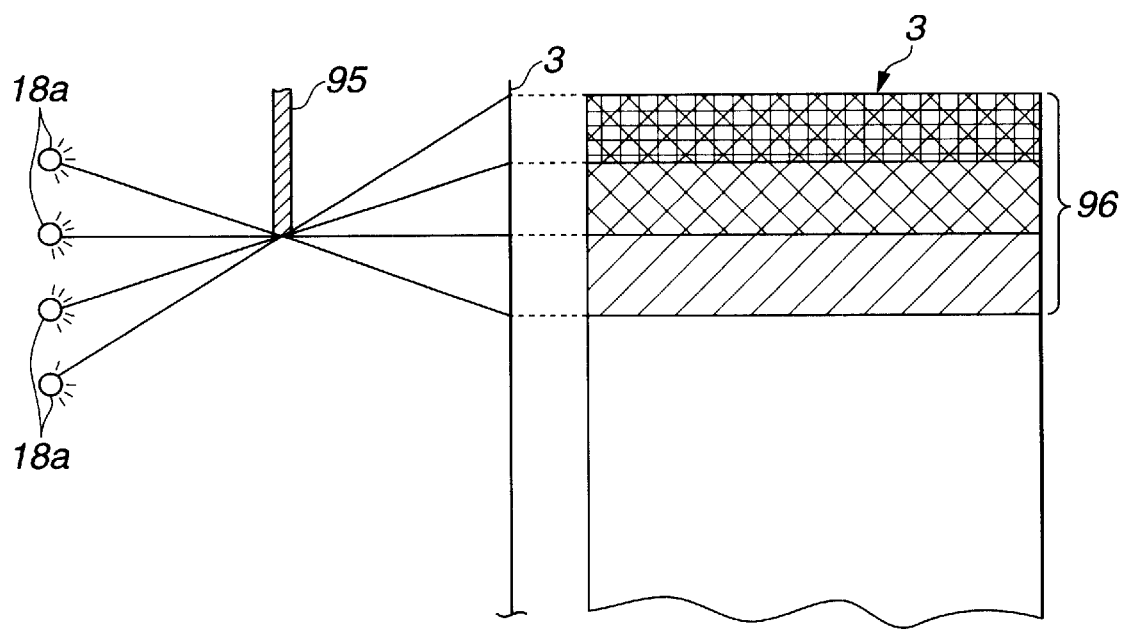
FIG. 28 shows occurrence of a stepwise distribution of luminance values on a screen when light radiated as a plurality of secondary light source images are intercepted by a sheet interceptor.

However, for example, the light projected from one of the adjoining projectors 1 may have to be, as shown in FIG. 26B, reflected using a mirror 27 because of the necessity in designing an optical system. In this case, color disjunction occurring in the partial images projected on the screen are, as shown in FIG. 27B, laterally reversed. Consequently, the partial images projected from the right and left projectors become greenish because the light rays representing the partial images have the purple light components (P) thereof intercepted by the sheet interceptor 5. When the partial images overlap each other, coloring in green is intensified.

Figure 26C:
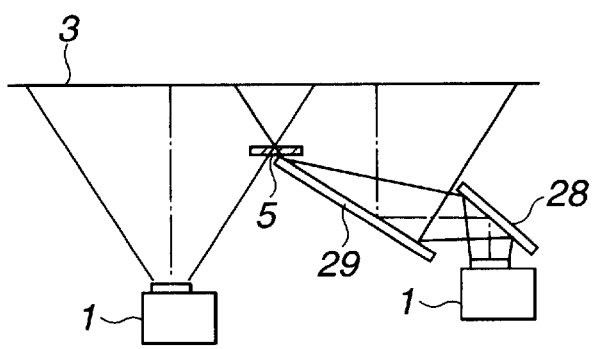

When a mirror has to be used in combination with a projector, a plurality of mirrors such as mirrors 28 and 29 should be, as shown in FIG. 26C, employed. Consequently, color disjunction in partial images extend, similarly to those shown in FIG. 27A, in the same directions. The color disjunction is therefore canceled out. In general, the number of mirrors placed on the path of light projected from one projector 1 and the number of mirrors placed on the path of light projected from the other projector 1 are determined so that the difference between the numbers of mirrors will be an even value.

Even in the second embodiment, in order to alleviate a belt-shaped distribution of luminance values, a sheet interceptor shaped to be alternately concave and convex must be employed as it is in the first embodiment. Otherwise, a sheet interceptor must be placed so that the intercepting edge thereof will obliquely cross the direction of rows of the secondary light source images arrayed in the form of a dot matrix. Consequently, both color disjunction caused by a multi-plate optical system and a belt-shaped distribution of luminance values can be alleviated.

The second embodiment can provide the same advantages as the first embodiment. A multi-display device including multi-plate projectors adopts a sheet polarizer as a sheet interceptor. Consequently, coloring occurring in the margin of a partial image can be resolved with colors well-balanced. Eventually, a high-quality image can be projected.

Moreover, adjoining projectors may be arranged so that colorings occurring in the margins of partial images will be superposed on each other and canceled out. Consequently, a higher-quality image can be projected.

Furthermore, the intercepting edge of an intercepting means is shaped to be alternately concave and convex. Otherwise, the intercepting means may be placed with its intercepting edge inclined. Consequently, a stepwise difference in luminance occurring in the margin of a partial image can be alleviated. Eventually, a higher-quality image is projected.

As described so far, according to the present invention, a multi-display device can alleviate a stepwise difference in luminance caused by the shadow of the intercepting edge of an intercepting means or coloring, which is derived from employment of a plurality of light sources or secondary light source images. Consequently, the multi-display device can project a higher-quality image.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A multi-display device comprising:
   a plurality of projectors for projecting partial images on a screen so that adjoining partial images will overlap to have margins thereof superposed on each other, the plurality of partial images being synthesized to construct one image, and each projector includes an illuminator that radiates light resulting in light source images that are arrayed two-dimensionally, a display that is illuminated with light radiated from the illuminator and displays the partial images, and a projecting optical system that projects light rays, which represent the partial images onto a screen; and
   a light interceptor that intercepts the marginal part of light to be projected as a partial image, and lowers the luminance in a portion of the partial image to be superposed on a portion of an adjoining partial image so that the luminance in the superposed portion of the overlapping partial images is substantially identical to the luminance in the other portions of the partial images that are not superposed on each other, the interceptor has an intercepting edge that comprises a plurality of parts that are not parallel to the direction of rows of said light source images.

2. A multi-display device according to claim 1, wherein:
the two-dimensional array of said light source images is arrayed in a dot matrix; and
said interceptor has the intercepting edge thereof shaped to be alternately concave and convex so that the intercepting edge has a plurality of discontinuous parts.

3. A multi-display device according to claim 2, wherein:
the intercepting edge has its concave and convex parts regularly alternated with a predetermined pitch between adjoining parts; and wherein the intercepting edge satisfies the following conditions:

$$(1/2) \times kP_{LV} < A_V < (3/2) \times kP_{LV}$$

$$(1/2) \times kP_{LH} < A_H < (3/2) \times kP_{LH}$$

where the height of the convex parts, that is, the depth of the concave parts is $A_V$, the pitch between adjoining concave and convex parts is $A_H$, the interval in the direction of the height $A_V$ between adjoining ones of said light source images arrayed in the form of a dot matrix is $P_{LV}$, and the interval in the direction of the pitch AH between adjoining ones of said light source images arrayed in the form of a dot matrix is $P_{LH}$, the distance of said interceptor from said light source images is d, the distance of said screen from said light source images is L, and k=(L−d)/2L is established.

4. A multi-display device according to claim 2, wherein:
the intercepting edge has its concave and convex parts randomly formed; and wherein the intercepting edge satisfies the following conditions:

$$(1/2) \times kP_{LV} < A_V < (3/2) \times kP_{LV}$$

$$(1/2) \times kP_{LH} < A_H < (3/2) \times kP_{LH}$$

where the height of the convex parts, that is, the depth of the concave parts is $A_V$, the pitch between adjoining concave and convex parts is $A_H$, the interval in the direction of the height $A_V$ between adjoining ones of said light source images arrayed in the form of a dot matrix is $P_{LV}$, and the interval in the direction of the pitch $A_H$ between adjoining ones of said light source images arrayed in the form of a dot matrix is $P_{LH}$, the distance of said interceptor from said light source images is d, the distance of said screen from said light source images is L, and k=(L−d)/2L is established.

5. A multi-display device according to claim 1, wherein the two-dimensional array of said light source images forms a matrix, said illuminator is placed so that the direction of rows of said light source images cross the intercepting edge of said interceptor but does not intersect it at right angles, whereby an intercepting edge having a plurality of continuous parts is realized.

6. A multi-display device according to claim 5, wherein said illuminator has the basic array of light source images compared to a rectangular matrix, and the rectangular matrix is placed so that a diagonal direction thereof crosses the intercepting edge of said interceptor but does not intersect it at right angles.

7. A multi-display device according to claim 1, wherein said interceptor comprises a sheet interceptor made of a material selected from the material group consisting of: a fully interceptive material, a translucent material, a material whose transmittance varies continuously so that a sheet interceptor made of this material will continuously change its transmittance towards the intercepting edge thereof, and a material whose transmittance varies stepwise so that the sheet interceptor made of this material will change its transmittance stepwise towards the intercepting edge thereof.

8. A multi-display device according to claim 1, wherein said interceptor is placed on a light path linking one of said light source images and said screen.

9. A multi-display device according to claim 1, wherein said interceptor has an intercepting edge whose distance from said light source images in the direction of the optical axis of said projecting optical system vanes.

10. A multi-display device according to claim 9, wherein said interceptor includes a sheet interceptor that has an intercepting edge, wherein the sheet interceptor is inclined relative to the optical axis of said projecting optical system, whereby an intercepting edge having continuous parts is realized.

11. A multi-display device according to claim 9, wherein said interceptor includes a plurality of sheet interceptors each having an intercepting edge, the plurality of sheet interceptors being placed so that the distances of the sheet interceptors from said light source images in the direction of the optical axis of said projecting optical system will be different from each other, thereby realizing a sheet interceptor having discontinuous parts.

12. A multi-display device according to claim 11, wherein:
said plurality of sheet interceptors include a sheet interceptor that intercepts lengthwise margins of a rectangular partial image, and a sheet interceptor that intercepts a sideways margin of the partial image, said sheet interceptors being placed at different distances from said light source images in the direction of the optical axis of said projecting optical system; and wherein
said interceptor further includes a supporting member that bears as an integral part thereof said plurality of sheet interceptors.

13. A multi-display device according to claim 1, wherein said interceptor is borne as an integral part by a projector that projects a partial image to be intercepted by said interceptor, so that said interceptor will maintain a predetermined positional relationship to the projector.

14. A multi-display device according to claim 1, wherein said interceptor is borne as an integral part by a projector adjoining a projector that projects a partial image to be intercepted by said intercepting means, so that said interceptor will maintain a predetermined positional relationship to the adjoining projector.

15. A multi-display devices comprising:
a plurality of projectors for projecting partial images on a screen so that adjoining partial images will overlap to have margins thereof superposed on each other, the plurality of partial images being synthesized to construct one image, and each projector including an illuminator that radiates light resulting in light source images which are two-dimensionally arrayed, a splitter that splits light radiated from said illuminator into three color light components of red, green, and blue, a red green, and blue color display whose colors are illuminated independently of one another with the light components of red, green, and blue propagated from said splitter and that displays red, green, and blue partial images, a luminous flux synthesizer that synthesizes light rays which are polarized light rays representing the color partial images displayed on said red, green, and blue color display, and a projecting optical system that projects light, which is propagated from said luminous flux synthesizer, on said screen; and an interceptor for intercepting the marginal part of light, which is projected as a partial image, on a light path linking said luminous flux synthesizer and said screen, and lowering the luminance in a portion of one partial image to be superposed on a portion of an adjoining partial image so that the luminance in the superposed portion will be substantially identical to the luminance in the other portions of the partial images which are not superposed on each other, said interceptor including a sheet interceptor that is placed so that the axis of polarization thereof will cross the directions of polarization in which an unnecessary color light component is polarized.

16. A multi-display device, comprising:

a plurality of projectors for projecting partial images on a screen so that adjoining partial images will overlap to have margins thereof superposed on each other, the plurality of partial images being synthesized to construct one image, and each projector including: an illuminator that radiates light resulting in light sources which are two-dimensionally arrayed; a splitter that splits light radiated from said illuminator into three color light components of red, green, and blue; a red, green, and blue color display whose colors are illuminated independently of each other with the red, green, and blue light components propagated from said splitter and display red, green, and blue partial image; a luminous flux synthesizer that synthesizes light rays which are propagated as the color partial images from said red, green, and blue color display; and a projecting optical system that projects light propagated from said luminous flux synthesizer on said screen; and an interceptor for intercepting the marginal part of light, which is projected as a partial image, on a light path linking said luminous flux synthesizer and said screen, and for lowering the luminance in a portion of one partial image to be superposed on a portion of an adjoining partial image so that the luminance in the superposed portion will be substantially identical to the luminance in the other portions of the partial images which are not superposed on each other, wherein:

a partial image is divided into a sub-partial image having one of the three colors of red, green, and blue and a sub-partial image having the other two colors;

when the sub-partial images are displaced, first color disjunction relevant to one color and second color disjunction relevant to the other two colors occur in the margins of the partial image;

adjoining projectors included in said plurality of projectors share the same superposed portion area on said screen;

one of the adjoining projectors projects a portion of a partial image suffering the first color disjunction at the superposed-portion area, and the other projector projects a portion of a partial image suffering the second color disjunction at the superposed-portion area, whereby the color disjunctions are thus canceled out in the superposed-portion area.

17. A multi-display device according to claim 15, wherein an intercepting edge of said interceptor has a plurality of parts that are not parallel to the direction of rows of said light source images.

18. A multi-display device according to claim 16, wherein a intercepting edge of said interceptor has a plurality of parts that are not parallel to the direction of rows of said light source images.

* * * * *